US010485190B2

(12) United States Patent
Whalley

(10) Patent No.: US 10,485,190 B2
(45) Date of Patent: Nov. 26, 2019

(54) CENTER PIVOT IRRIGATION SYSTEM WITH PLACEMENT CONTROL PROVIDING ZONES WITH VARIABLE DEPTHS OF APPLICATION

(71) Applicant: TRIMBLE NAVIGATION LIMITED, Sunnyvale, CA (US)

(72) Inventor: Mark Whalley, Christchurch (NZ)

(73) Assignee: TRIMBLE INC., Sunnyvale, CA (US)

(*) Notice: Subject to any disclaimer, the term of this patent is extended or adjusted under 35 U.S.C. 154(b) by 364 days.

(21) Appl. No.: 15/186,769

(22) Filed: Jun. 20, 2016

(65) Prior Publication Data
US 2017/0359974 A1 Dec. 21, 2017

(51) Int. Cl.
| | | |
|---|---|---|
| A01G 25/00 | (2006.01) | |
| A01G 25/09 | (2006.01) | |
| A01G 25/16 | (2006.01) | |
| B05B 12/12 | (2006.01) | |
| B05B 12/04 | (2006.01) | |

(52) U.S. Cl.
CPC ......... *A01G 25/092* (2013.01); *A01G 25/162* (2013.01); *B05B 12/04* (2013.01); *B05B 12/12* (2013.01)

(58) Field of Classification Search
CPC .... A01G 25/16; A01G 25/162; A01G 25/165; A01G 25/092; B05B 1/20; B05B 1/30; B05B 12/12; B05B 12/124
USPC .......................................... 239/728–731, 69
See application file for complete search history.

(56) References Cited

U.S. PATENT DOCUMENTS

| | | | | |
|---|---|---|---|---|
| 5,246,164 A | * | 9/1993 | McCann | A01B 79/005 239/11 |
| 5,927,603 A | | 7/1999 | McNabb | |
| 6,085,999 A | * | 7/2000 | Gerdes | A01G 25/092 239/66 |
| 2002/0066810 A1 | | 6/2002 | Prandi | |
| 2014/0110498 A1 | | 4/2014 | Nelson | |

FOREIGN PATENT DOCUMENTS

WO 2013191738 A1 12/2013

OTHER PUBLICATIONS

International Preliminary Report on Patentability for International Application No. PCT/US2017/035128 dated Dec. 25, 2018.

\* cited by examiner

*Primary Examiner* — Alexander M Valvis
(74) *Attorney, Agent, or Firm* — Marsh Fischmann & Breyfogle LLP; Kent A. Lembke

(57) ABSTRACT

A center pivot irrigation system is described that includes a controller that makes use of a particular flow rate of input water to deliver differing or variable depths of irrigation to two or more user-defined areas under a pivot irrigator. The controller operates to pulse control valves for the nozzles/sprinkler heads on and off as the sprinkler arm rotates. The valve pattern along the span of the sprinkler arm is chosen during each operating cycle such that the total water flow through all the open valves matches the flow rate of the input or supply water to the pivot irrigator. To ensure the variable application depth, the speed may be changed during valve duty cycles. A farmer may define an irrigation plan that defines the variable rate irrigation (VRI) zones and also defines exclusion or no spray zones in which no irrigation should occur.

13 Claims, 20 Drawing Sheets

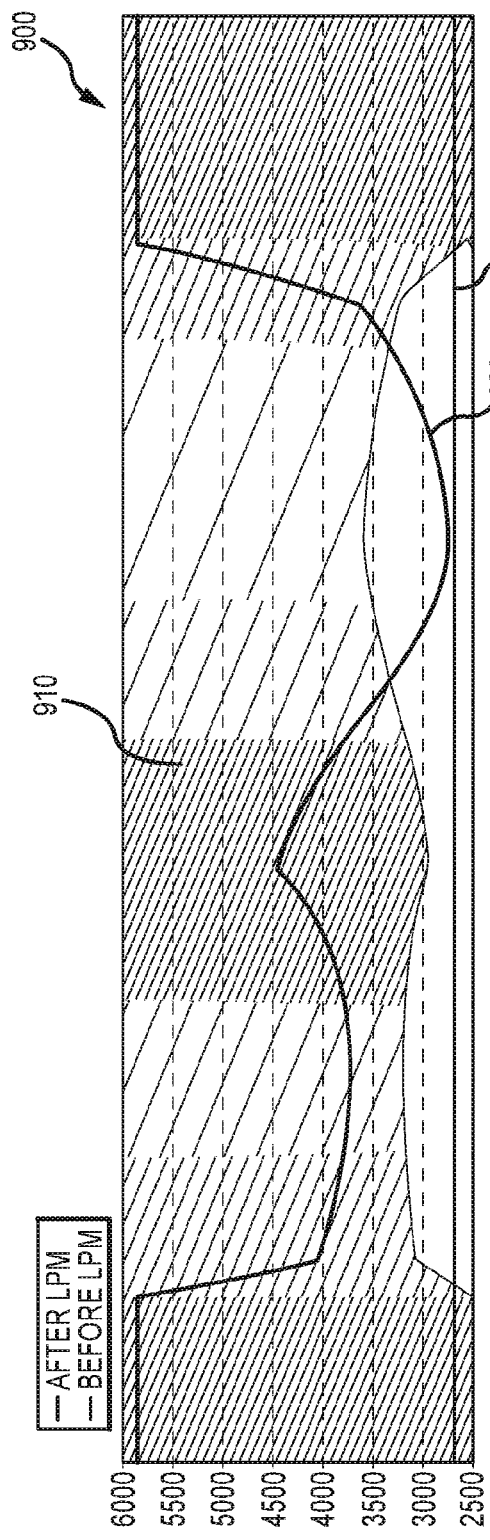
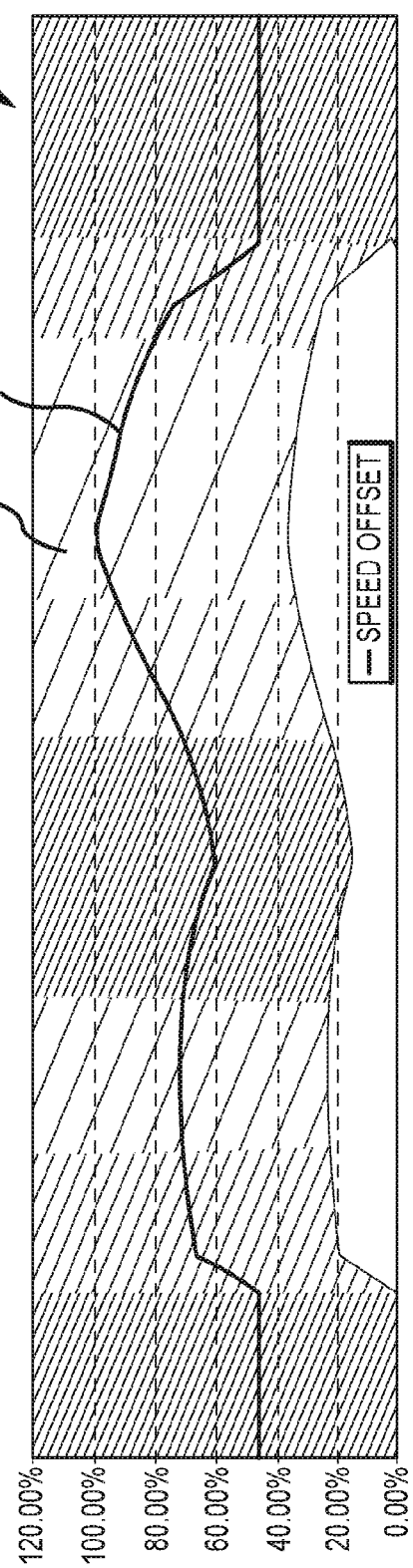

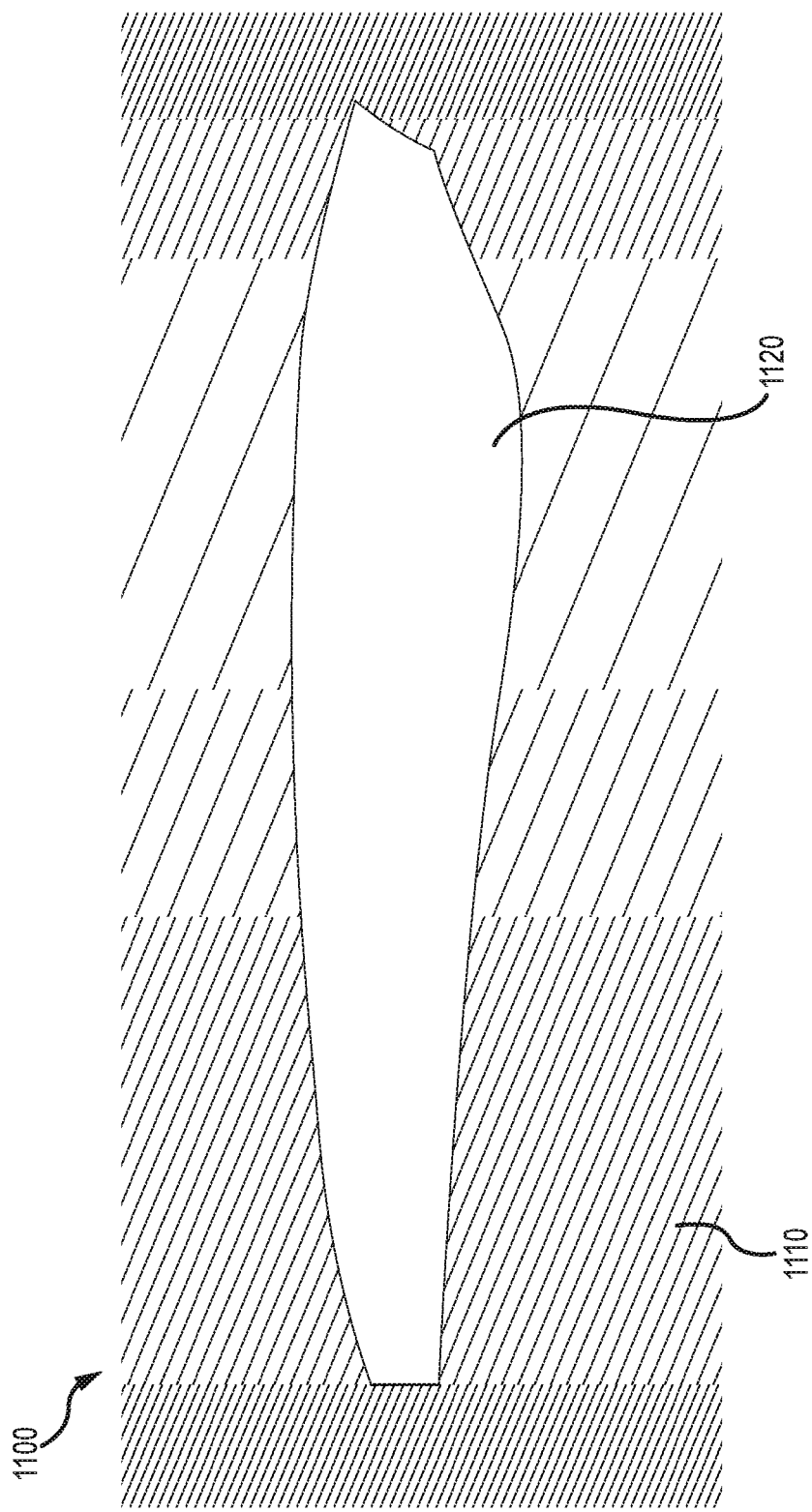

FIG. 13

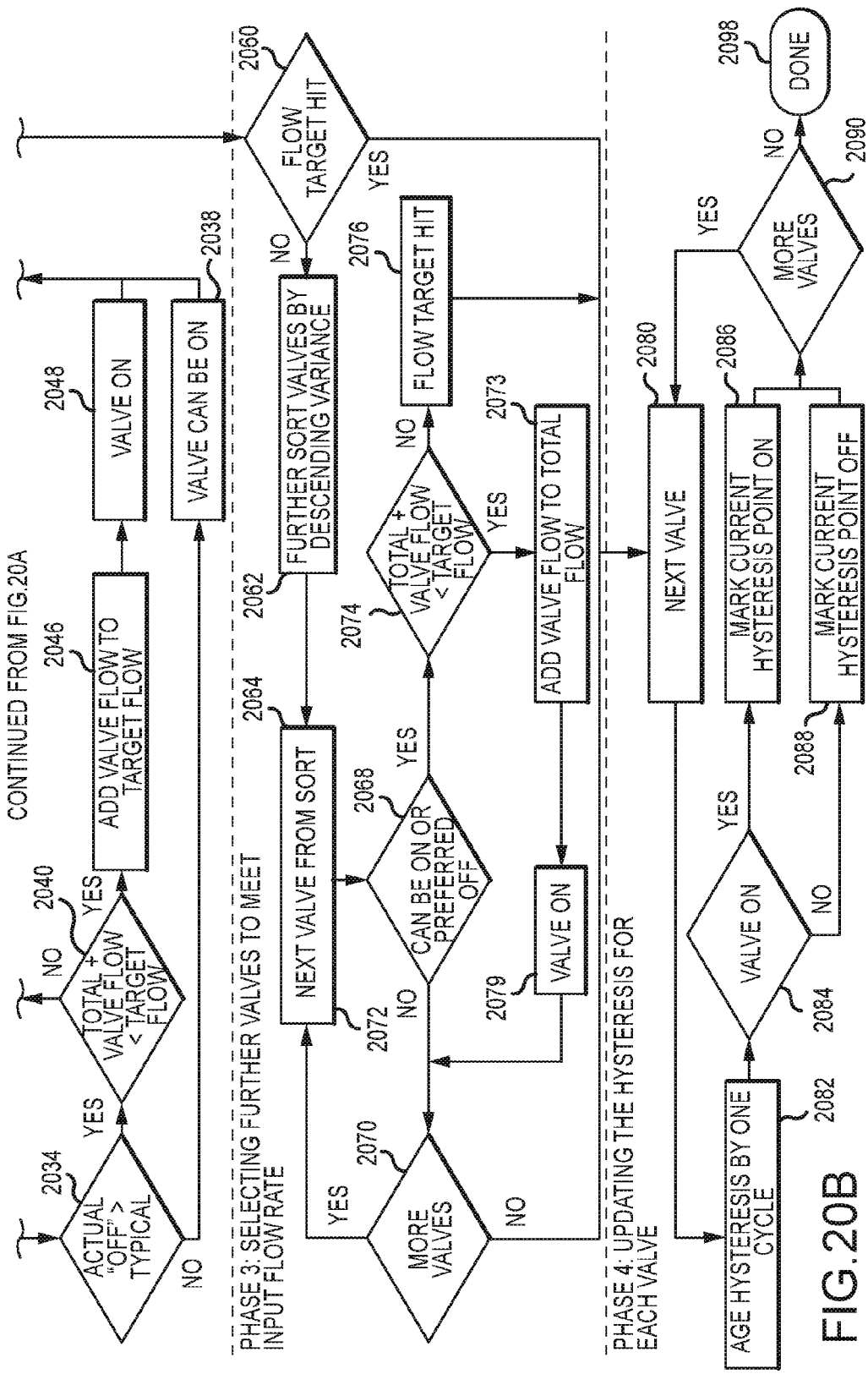

CENTER PIVOT IRRIGATION SYSTEM WITH PLACEMENT CONTROL PROVIDING ZONES WITH VARIABLE DEPTHS OF APPLICATION

BACKGROUND

1. Field of the Invention

The present invention generally relates to systems and methods for controlling operation of a center pivot irrigation system and, more particularly, to a center pivot irrigation system that is configured to selectively provide variable depths of water application in farmer-selected areas (or zones) of irrigated land even with changing water flow and/or pressures being input by the center pivot irrigation system pump(s).

2. Relevant Background

In many areas of the world, the agricultural industry relies upon effective irrigation to raise crops. Irrigation may be used due to limited rainfall or rainfall that is not adequate for a particular crop. Further, irrigation may be utilized due to the variability in the timing of rainfall as many crops require a relatively consistent amount of water over their growing period.

Center pivot irrigation is one of the most water-efficient irrigation techniques. Center pivot irrigation is a form of overhead sprinkler irrigation that makes use of a long sprinkler arm formed of several segments of pipe joined together and supported by trusses. The pipe segments are mounted on wheeled towers each typically driven by an electric motor. Sprinklers or sprinkler heads are spaced apart along the length or span of the sprinkler arm. The sprinkler arm is centrally anchored such that the sprinkler arm moves in a circular pattern, and water is fed into the sprinkler arm at the center of the circle via one, two, or more pumps that may be positioned anywhere between the sprinkler arm and a water source such as an aquifer.

The outside set of wheels on the arm may set the master pace for the rotation such as once every three days. The inner sets of wheels can be mounted at hubs or towers between two pipe segments, and angle sensors can be used to detect when the bend at the joint between the two segments exceeds a certain maximum threshold as an indication of when the electric motor driving the inner wheel sets should be rotated to keep the pipe segments generally aligned along the arm span. Center pivot sprinkler arms are typically less than about 1600 feet (or 500 meters) in length (i.e., irrigated circle radius) with a common size being 440 feet (or a quarter mile or 400 meters) length or circle radius, but many pivot sprinkler arms may be much longer than 500 meters in length.

Most center pivot irrigation systems use sprinklers that hang down from the sprinkler arm pipe segments so that the sprinkler heads are positioned a few feet above the ground or crop so as to limit evaporative losses and wind drift. There are many different sprinkler head or nozzle configurations that may be used including a static plate, a moving plate, and so on with a rotator-style pivot applicator sprinkler head or nozzle being one of the more popular in present irrigation systems. The rotator-style sprinkler head or nozzle is adapted to work properly with input water at a particular pressure (or within a desired range and not very well or at all if too far below this pressure), and a pressure regulator may be provided upstream of each nozzle or sprinkler head to ensure that each is operating at the correct design pressure (not over pressurized).

Often, an important operational goal of a center pivot irrigation system is to provide uniform application of water, which may include effluent, chemicals, and fertilizers, and to avoid applying too much water in one application (e.g., by running too slowly) so as to reduce run-off and leaching. To achieve such uniform application, the center pivot irrigation system generally requires an even emitter flow rate across the length or span of the sprinkler arm. Since the outer-most pipe segments and wheeled towers travel farther in a given time period (e.g., at a higher speed) than the inner-most pipe segments and wheeled towers, nozzle sizes may be smallest at the inner spans and increase in size with distance from the pivot point such that a greater flow of water is output at positions on the sprinkler arm that are moving the fastest (and a lower flow of water is output at positions on the sprinkler arm that are moving the slowest).

While center pivot irrigation systems are considered to be highly efficient systems that are useful in conserving water, there remains a number of challenges associated with their use to irrigate crops. One challenge is that the amount of water available to the center pivot irrigation system may vary over a growing season. For example, water may initially be available at a flow rate of 550 to 600 gallons per minute (GPM) but later drop down to 400 to 450 GPM. Presently, one solution to this problem of varying input water flow rates is to change out the nozzle sizes along the entire length of the sprinkler arm to continue to have uniform output flows and to have nozzles that operate well at lower pressures. Keeping a separate set of nozzles and changing them out midseason can be very expensive and time consuming. Another approach to addressing this problem is to utilize a variable speed pump(s), which enables valve-based irrigation zones to be chosen easily as input flow rate is not a concern. However, a variable speed pump does not help reduce problems with changing water availability, and such pumps are much more expensive to use and maintain than more commonly available pumps. Hence, there remains a need for an improved center pivot irrigation system that can handle varying input flow rates or water availability.

Another challenge to using center pivot irrigation systems is how to selectively water a field to leave some portions dry or non-irrigated. For example, a farmer may have a field that has one or more obstacles or areas where no crops are planted such as a rocky area or a road, and it may be a waste of precious and expensive water to irrigate all areas of the field uniformly as is presently the case with many center pivot irrigation systems. One could turn off a nozzle or two, but obstacles generally are not circular or ring-shaped. This challenge also arises because certain portions of a field simply are not as productive as other areas (e.g., due to soil conditions or other reasons), and the farmer may wish to leave these areas of the field fallow for business reasons and only apply water to the best producing areas within a field (e.g., the farmer wants to be able to pick and choose where to irrigate). Often, the areas where irrigation is not as desirable will be very irregularly shaped and may be located in various, spaced-apart locations within the circular area covered by a center pivot irrigation system. With these issues in mind, prior irrigation control solutions attempted to provide controls to selectively irrigate a field with a center pivot irrigation system and meet the need for an improved control method or irrigation system that allows selective watering of areas or portions covered by a center pivot

SUMMARY

Briefly, the inventor previously created a center pivot irrigation system with a controller (e.g., hardware and software for controlling operations of the system) that makes use of a particular flow rate of input water (provided by pumps or other water supply devices that may vary over a growing/irrigation season) to deliver a consistent depth of irrigation to user (e.g., a farmer) defined areas under a pivot irrigator or its sprinkler arm. To this end, the controller may operate to pulse control valves for the nozzles/sprinkler heads on and off as the sprinkler arm rotates in the field. The valve open/close pattern along the span or length of the sprinkler arm is chosen during each operating cycle (e.g., each valve duty cycle such as a time period in the range of 20 to 90 seconds or the like) such that the total water flow through all the open valves (and associated nozzles) is as close as practicable to the flow rate of the input or supply water to the pivot irrigator. To ensure a consistent depth, the pivot irrigator's rotation speed is set during each valve duty cycle to match the density of open valves in the sprinkler arm (e.g., speed is increased when the valve open/close pattern is denser and speed is decreased when the valve open/close pattern is less dense). To ensure a consistent distribution across the irrigated area(s)/zone(s) under the sprinkler arm, each valve is monitored to ensure that the valves (and associated nozzles/sprinkler heads) are given the same proportional share of the input water.

In practice, the center pivot irrigation system is controlled so as to irrigate the farmer-designated or desired areas of the field. The control acts to cause more or less of the irrigator's nozzles to be used but doing so with a "constant" flow rate so that the number of valves open at any time adds up to approximately the same total flow. Use of the term or phrase "constant flow" should be understood to be within a range of flow rates about a target or goal rate. In part, this is because the irrigation system's controller is designed to determine the incoming flow rate based on water pressure, and, therefore, the controller can handle changes in the flow rate through the sprinkler arm over time. However, in a typical irrigating operation, the flow rate is not changing frequently or on an ongoing basis. The flow rate, instead, largely remains "constant" with fixed drive pumps providing the input flow or supply water to the sprinkler arm, and, from time-to-time (or over more infrequently), the flow rate may change with the controller of the system compensating for such a change.

The inventor recognized the growing need and demand for a method of controlling a center pivot irrigation system so as to be able to apply differing depths to different zones or areas of a particular field. This may be desirable due to the existence of different soils in the same field under an irrigation system. Differing application depths may also be useful in allowing a farmer to plant different crops within the same field with the understanding that each of these crops may require differing amounts of irrigation at particular times of the growing season.

Hence, the inventor created a new center pivot irrigation system with a controller (e.g., hardware and software for controlling operations of the system) that makes use of a particular flow rate of input water (provided by pumps or other water supply devices that may vary over a growing/ irrigation season) to selectively deliver a consistent depth of irrigation to multiple user (e.g., a farmer) defined areas (or zones) under a pivot irrigator or its sprinkler arm. To this end, the controller may operate to pulse control valves for the nozzles/sprinkler heads on and off as the sprinkler arm rotates in the field to provide variable depth application zones (along with, in some cases, exclusion zones where no irrigation is to take place). The new system may be considered a variable rate irrigator (or "VRI"), and it is configured (or its controller is configured) to handle similar pressure issues as the prior controller but to control the center pivot irrigation system to apply an amount of water coming in to the irrigator so as to achieve differing rates of application. No presently available controller is able to take an unknown and variable input flow rate and provide a controlled variable rate of application depth to a pivot irrigator.

For example, a farmer may define a first zone (Zone X) that is to receive a first application depth (e.g., full irrigation or 100 percent) while a second zone (Zone Y) is defined and designated as receiving a second application depth (e.g., some fraction or percentage of the amount applied in Zone X). The control process implemented by the controller is very different than the one used to achieve uniform application, and, as explained below, it may vary the speed of the irrigator (with the irrigator often running much slower than maximum speed such as at about 20 percent of the maximum velocity) to handle different nozzle open/close patterns (or valve pulsing) to achieve the variable application rates for these different irrigation zones (e.g., to achieve or provide a total average flow rate through the arm at any particular time of operation).

More particularly, a center pivot irrigation system is described that is operable to provide variable application depths in user or operator-defined irrigation zones and also to limit irrigation in exclusion or no spray zones. The system includes a sprinkler arm with one or more pipe segments each including a plurality of spaced apart nozzles. The system also includes a plurality of towers supporting the sprinkler arm, and a drive motor is provided on each of the wheeled towers to drive wheels on the tower to rotate the sprinkler arm about a center pivot axis at a rotation speed. Further, a water supply assembly is included that provides input water to the sprinkler arm (e.g., one-to-many pumps and associated valves and piping). The system also includes a plurality of control valves each provided on the sprinkler arm upstream of a set of the nozzles.

A controller is included that runs or executes a valve operation module (with a variable application depth routine) that, for each of a plurality of sequential valve duty cycles, generates a valve pattern defining a group of the nozzles to discharge the input water from the sprinkler arm and transmits control signals to the control valves causing the control valves associated with the group of nozzles to open. Further, the system includes a location monitor on the sprinkler arm determining a current geographic location of the sprinkler arm. During system operations, the controller generates the valve pattern based on both the current geographic location and an irrigation plan defining a first irrigation zone and a second irrigation zone. Typically, the first irrigation zone is assigned a first application depth while the second irrigation zone is assigned a second application depth differing from the first application depth (e.g., to allow a farmer to set how much of the available water is provided to two or more zones within each irrigated field to suit the crops, suit differing soils, and so on). While two application depths associated with two different irrigation zones are discussed in this example, it will be understood that there can be two to many irrigation zones defined for a particular field being irrigated, and each of these many zones can be assigned a different application depth according to the present description (e.g., see FIG. 17 for a sprinkler arm being over four irrigation zones (assigned three application depths) as well as an exclusion zone at the same time or at a particular arm position).

In some embodiments, the group of nozzles defined by the valve pattern differs for each of the valve duty cycles. In the same or other embodiments, the controller generates the valve pattern for each of the valve duty cycles to output the input water at a flow rate within a predefined range of flow rates including a rate measured for the input water to the sprinkler arm. The system may also include at least one of a flow meter and a pressure gauge measuring flow rate of the input water and pressure of the input water. Then, the valve pattern may be generated for each of the valve duty cycles to provide the output of the input water at the flow rate based on at least one of the measured flow rate and the measured pressure of the input water. In some embodiments, the irrigation plan further includes an exclusion zone, and any of the nozzles determined to be located above the exclusion zone is preferentially excluded (e.g., not used unless required to disperse the input water flow) from the group of nozzles used to discharge the input water from the sprinkler arm by the controller.

In some cases, the controller generates and transmits a speed control signal to one or more of the drive motors to adjust the rotation speed of the sprinkler arm based on a density of open valves in the valve pattern to maintain the first or second application depth. Further, it may be useful to implement the system with the controller retrieving a hysteresis for each of the valves and generating the valve pattern based on the hysteresis. The hysteresis provides an on and off history of each of the valves for a predefined number of the valve duty cycles, e.g., the predefined number is in the range of 20 to 40 (such as 32 in some examples) for memory/processing optimization. Then, the valve pattern may be generated to include valves that need to irrigate based on the on and off history and the first or second application depth.

BRIEF DESCRIPTION OF THE DRAWINGS

FIGS. 9 and 10 illustrate operational results when the flow and placement control method is applied to a pivot irrigator used in the field represented by the maps and irrigation plan of FIGS. 6-8;

FIG. 11 illustrates a graph similar to the graph of FIG. 9 as the pivot irrigator is rotated over the fourth exclusion zone of the irrigation plan that defines a no spray area in the center of the pivot area;

FIGS. 12 and 13 illustrate graphs showing results of use of a pivot irrigator controlled by the techniques taught herein and also a spreadsheet showing the resulting flow rates from a valve pattern used to provide uniform flow as the sprinkler arm is rotated over no spray areas (or exclusion zones, with these two terms used interchangeably herein);

DETAILED DESCRIPTION

Figure 1:
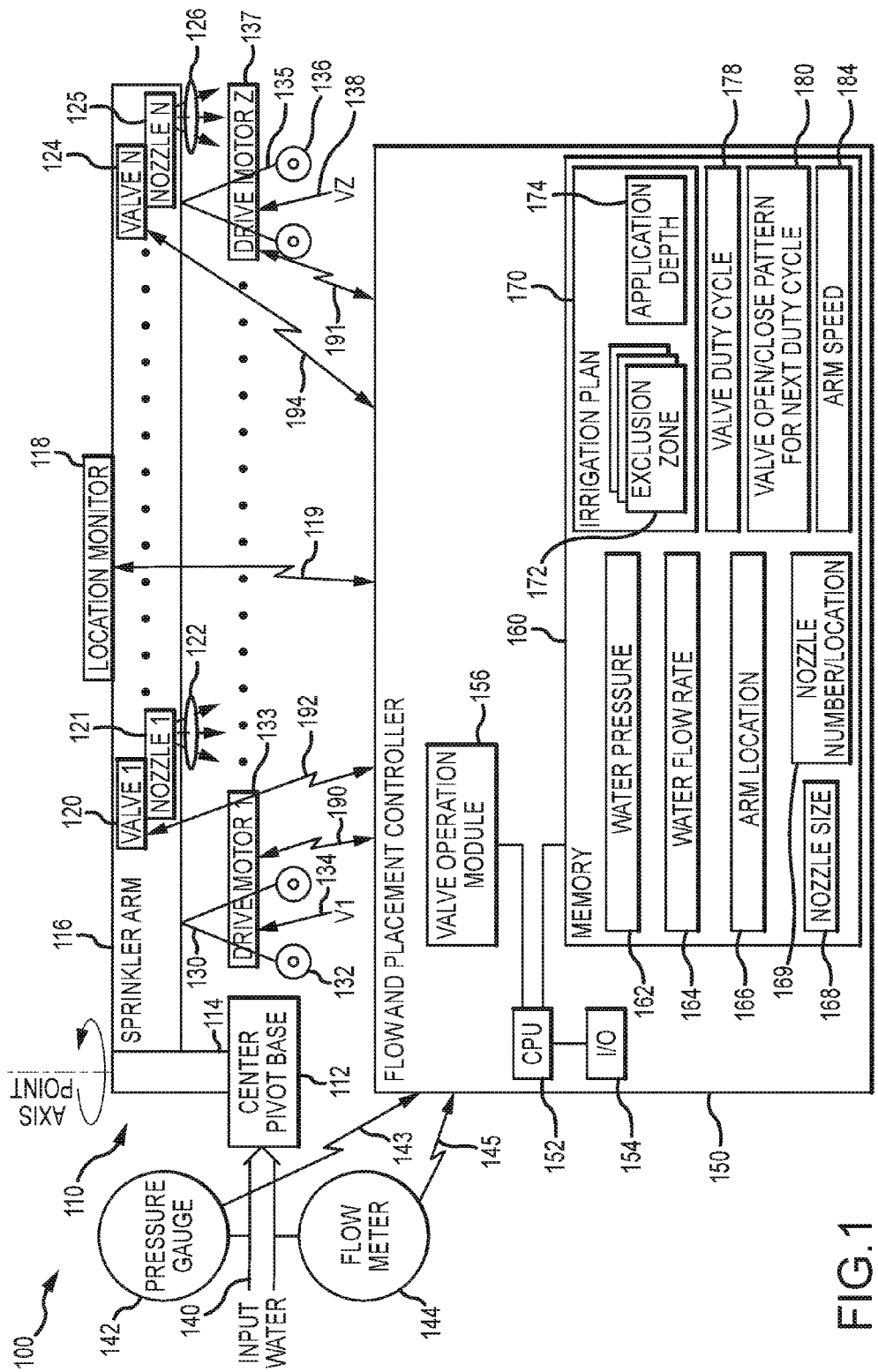
FIG. 1 is a functional block diagram or schematic of a center pivot irrigation system, with the system memory storing (e.g., with elements 168 and 169) data on a collection of valves/nozzles each with a design flow rate, ordinal location, and distance from center (to triangulate actual position)

Briefly, the following describes a center pivot irrigation system that provides a flow and placement controller (or water flow controller) that is specially adapted to control an irrigator (or sprinkler arm assembly) to provide variable depth application zones. In prior work, the inventor taught an "optimal flow" controller that effectively controlled the irrigator to provide uniform application depths along with no spray or exclusion zones, and the following description is organized to first describe this prior uniform flow-type controller and its operations (e.g., with reference to FIGS. 1-15). Then, the description will proceed to teach the new center pivot irrigation system with its flow and placement controller configured to provide variable depth application (or to implement variable rate irrigation (VRI)). The VRI controller utilizes pressure-based input flow, e.g., as described with the prior uniform flow-type controller. However, the VRI controller performs an entirely different and new calculation process for determining the pulsing pattern of valves (on/off pattern for each duty cycle of the irrigation system) to provide zones with varying depth (along with exclusion zones in some cases).

The uniform flow-type center pivot irrigation system includes a flow and placement controller (or water flow controller) that is specially adapted to effectively control an irrigator (or sprinkler arm assembly) to more efficiently make use of an input water supply. The flow rate or pressure of input water may vary over a growing season (or irrigation season), and the flow and placement controller is useful for providing uniform depth of watering even with the changing inputs. Further, the farmer is able to designate one or more exclusion or "no irrigation" zones and a desired depth of watering desired for their field or crops. The flow and placement controller selectively operates the nozzles or sprinkler heads (e.g., via solenoid or other control valves provided for each nozzle or each set of nozzles (as two or more may be controlled by each solenoid/control valve)) and/or by adjusting the speed of the sprinkler arm (or rate of rotation). The following description provides examples of irrigation control for a center pivot irrigator, but it should be understood that the control concepts also may be used with a lateral irrigator in which there is no fixed center point but the entire irrigator can move with one end of the lateral pivot being the main control point (and some lateral irrigators can also rotate).

The use of the precision irrigation provided by the control methods described herein include: improve crop quality and yield; optimize water resources; increase water use efficiency; minimize input costs of water, fertigation, chemigation, and effluent; reduce energy costs for fuel and electricity; reduce trips to the irrigated field; ensure even application to reduce run-off and leaching; and allow water to be applied only to the most productive areas within a field. Added control is provided because pivot irrigators and/or pumps may be controlled when they are determined to be stopped or encounter errors (e.g., based on monitored changes in the flow rate or pressure of the input water). The farmer or pivot irrigator user is able to create a variable rate irrigation plan that may include exclusion zones (or no irrigation zones/areas) for targeted application of the water supply (which may include fertilizer, chemical, effluent, and the like and still be considered "input water" for the sprinkler arm). The control method applies the right amount of water in the right place in the field (in irrigation zones identified in the irrigation plan) by comparing a present arm location in the field with the irrigation plan and then selectively controlling each nozzle or sprinkler head (via a control valve) along with the speed of the pivot arm.

FIG. 1 illustrates a center pivot irrigation system 100 that is configured to implement the flow and placement control method or techniques described herein. As shown, the irrigation system 100 includes a pivot irrigator (or sprinkler arm assembly) 110 that includes a center pivot base 112 upon which a pivot hub 114 is pivotally mounted. A sprinkler arm 116, which typically would include a number of interconnected pipe segments, extends outward a distance such as 300 to 500 meters or the like. The sprinkler arm 116 is supported by a number of towers 130, 135 that include a set of wheels 132, 136 and are driven at a rotation or arm speed as shown with arrows 134, 138 (and as $V_1$ and $V_2$) by separately operable electric drive motors 133, 137. Typically, the outer most drive motor 137 is used to pace rotation of the arm 116 about the pivot axis, $Axis_{Pivot}$, with the inner drive motors 133 operating to maintain alignment of the various pipe segments of the arm 116. During irrigation operations, input water 140 is pumped or otherwise provided to the sprinkler arm 116 via the base 112 and hub 114 such as at a flow rate ranging from 400 gallons per minute (GPM) or less up to 2000 GPM or more. The input water flow rate typically is relatively constant for periods of time during a growing season but will typically vary at least periodically, e.g., vary from about 600 GPM at the beginning of a growing/irrigation season and then drop to 400 GPM toward the end of the growing season as the amount of water available for irrigation decreases. As noted above, the system 100 may include a non-rotating or rotating lateral irrigator in place of the center pivot irrigator 110 shown in FIG. 1.

The pivot irrigator 110 includes a plurality of nozzles 121, 125 spaced apart along the length or span of the sprinkler arm 116 for use in selectively discharging the input water 140 from the arm 116 to irrigate a field/crop as shown with arrows 122, 126. Significantly, the irrigator 110 also includes a control valve 120, 124 upstream of each nozzle 121, 125 to allow individual control/operation of each nozzle 121, 125, which allows selective application of the input water 140 to irrigation zones/areas of a field and no (or little) application to areas of the field in exclusion zones.

The inventor further determined that it would be desirable to provide uniform application of the input water in the irrigation zone/area while still utilizing a "constant" flow rate of the input water (i.e., without having to use a variable speed input pump). This is achieved in part by selecting nozzles 121, 125 that have relatively large capacities or flow ratings for their design pressure (which is typically controlled by a pressure regulator (not shown) at each nozzle 121, 125). The amount of "over sizing" of the nozzles 121, 125 may vary with one example being a capacity that would be needed to discharge an anticipated flow rate for the input water 140 if two thirds of the valves 120, 124 were closed (e.g., instead of using 3 GPM rated nozzles 121, 125, the nozzles 121, 125 may be chosen to be 9 GPM nozzles when water pressure is within a predefined pressure range). This allows the valves 120, 124 to be operated in an open/close pattern that causes a large number of the nozzles to be closed (e.g., up to two thirds in this non-limiting example) and still allow the input water 140 flow to be discharged as shown at 122, 126. The size/capacity of the nozzles, although oversized, still typically increase in capacity from the inner locations of the arm toward the outer locations of the arm.

The irrigation system 100 further includes a flow and placement controller 150 to monitor and control operations of the pivot irrigator 110 and its nozzles 121, 125 via the control valves 120, 124 and the drive motors 133, 137. The controller 150, which may take the form of a desktop, laptop, tablet, irrigation system controllers (e.g., irrigation controller electronics presently commercially available or designed in the future modified to provide the functionality described herein), or other computing device, includes one or more processors 152 that manage and/or operate input and output devices 154, which may be used to allow an operator to input and view data (such as via a keyboard, touchscreen, mouse, monitor, and the like). The I/O devices 154 also are used to provide wired or, more typically, wireless communications with the pivot irrigator 110 and its components.

Particularly, as shown in FIG. 1, the controller 150 operates to receive data from a pressure gauge 142 and from a flow meter 144 via wired/wireless signals 143, 145, and the controller manages memory/data storage devices 160 to store the measured water pressure 162 and water flow rate 164 of the input water 140. Further, the pivot irrigator 110 includes a location monitor 118, such as a Global Navigation Satellite System (GNSS) receiver or the like, that operates to gather location data (e.g., latitude and longitude information) for the sprinkler arm 116 that is transmitted in communications/signals 119 to the controller 150. The processor 152 acts to at least temporarily store this arm location data 166 in the memory 160. Further, the I/O devices 154 are operated by the processor 152 to transmit control signals to the drive motors 133, 137 as shown at 190, 191 and to the individual control valves 120, 124 for the nozzles 121, 125 as shown at 192, 194. In some cases (e.g., in a system 100 with a smart pivot 110), the controller 150 may ask the pivot's own controller (not shown in FIG. 1) to make a certain velocity while in other cases, as shown, the controller signals 190, 191 the motors 133, 137 only (and the motors 133, 137 drive themselves as discussed above).

The controller 150 also operates to execute or run software code/programs to provide a valve operation module 156 that operates, as discussed further herein, to process the irrigator monitoring data 162, 164, 166 and, in response, to generate the control signals 190, 191 to control the speed 134, 138 of the arm 116 and to control which valves 120, 124 are open and which valves 120, 124 are closed during each operating period. The operating period may be labeled a "valve duty cycle" and stored as shown at 178 in the memory 160. The valve duty cycle 178 may be varied to implement the irrigation system 100 with a time period in the range of 20 to 120 seconds typically being useful and with a 30 second time period being used in some of the examples provided herein. Prior to each valve duty cycle (e.g., prior to the next 30 second time period), the valve operation module 156 acts to determine a valve open/close pattern 180, which defines which of the nozzles 121, 126 will be used to discharge 122, 126 the input water 140 (i.e., which valves 120, 124 will be controlled via signals 192, 194 to be open along the span of the arm 116).

To this end, the valve operation module 156 may process a variety of information to ensure ongoing use of the whole amount of the input water 140. The input data to the module 156 may include nozzle sizes or output capacity ratings 168 as well as the nozzle number and location 169 along the arm 116 as shown as stored in memory 160. For example, a sprinkler arm 116 may include a relatively large number of nozzles 121, such as 30 to 250 or more, that are spaced apart some predefined/known distance, such as 5 to 20 meters or the like (e.g., the actual distance from the axis point (or element 114) may be recorded to each individual valve 120, 124/nozzle 121, 125 and then used to triangulate each valve's position individually). The valve operation module 156 can use the nozzle sizes/capacities 168 and number information 169 along with the water pressure 162 and/or flow rate 164 of the input water 140 to determine what fraction/percentage of the nozzles 121, 125 need to operate to output the input water. The final actual resulting valves open (valve pattern 180) are chosen based on their flow rates in many implementations (and not on a percentage of the volume of the nozzles), and the percentage value may be used as a leading indicator with this ratio being used by the module 156 (in some cases) to help evenly space apart the valves that are open during a valve duty or irrigating cycle.

Further, though, the valve open/close pattern 180 may depend on user/farmer input information that may be provided as an irrigation plan 170 stored in memory 160 or otherwise accessible to the valve operation module 156. In the irrigation plan 170, a user/farmer may define one or more exclusion zones (or no irrigation areas) 172 in the field in which the pivot irrigator 110 is positioned and operated. For example, the field may have obstacles or features where no crops are planted such as a road or river, and these areas may be defined by a boundary (e.g., a plurality of geographic coordinates) in the field or circular area covered by the sprinkler arm 116 during its rotation. As another example, the farmer may have determined that due to soil properties or other factors that one or more areas or zones in the field are not productive enough to justify irrigation, and these areas may be included in the exclusion zones 172 (defined by a geographic coordinate-based boundary).

The exclusion zones 172 are used in conjunction with the arm location 166 and nozzle location information 169 to determine which valves should be closed (or which should be opened) in the pattern 180 for the next duty cycle (i.e., close valves 120, 124 associated with nozzles 121, 125 over or spraying onto an exclusion zone). Once the pattern 180 is defined for a next duty cycle, the controller 150 may operate at the start of the duty cycle to generate and transmit the control signals 192, 194 to the control valves 120, 124 (or only to those that have their operational status changed from the prior duty cycle in some implementations).

Further, the irrigation plan 170 may allow the user/farmer to define application depths 174 for irrigation zones (i.e., areas of the irrigated circular area not in an exclusion zone 172). These may vary to suit a particular crop and may be changed over a growing season (e.g., more water may be desired at particular times during a growing cycle for a crop and may vary between crops) and/or due to weather conditions (e.g., less application if rainfall has occurred and the like). The valve operation module 156 may use the application depth 174 to set the valve open/close pattern 180 in an irrigation zone and/or to set the arm speed 184, e.g., decrease the speed 134, 138 of the arm 116 when a greater application set is defined for the irrigation zone and vice versa. Again, when the center pivot includes its own controller (e.g., is a smart pivot), the controller may communicate with the pivot's own controller to make a certain velocity.

The arm speed 184 may also be set by the valve operation module 156 based on a particular valve open/close pattern 180. For example, a pattern 180 may be very dense (i.e., include many open valves 120, 124 in a relatively short span of the arm 116), and the arm rotation speed may be increased when such a pattern 180 is utilized so as to retain a desired uniform application depth in the irrigation zones under this dense pattern of opened valves. The arm rotation speed may be decreased when the pattern 180 is less dense so as to retain a desired uniform application depth in the irrigation zones under this less dense pattern of opened valves. The arm speed 184 is used by the controller 150 to generate and transmit control signals 190, 191 to the drive motors 133, 137 on the arm support towers 130, 135 to control or set the rotation speed of the arm 116 during the next or upcoming duty or operation cycle (e.g., for the next 30 seconds or other predefined operating cycle for the irrigation system 100).

Figure 2:
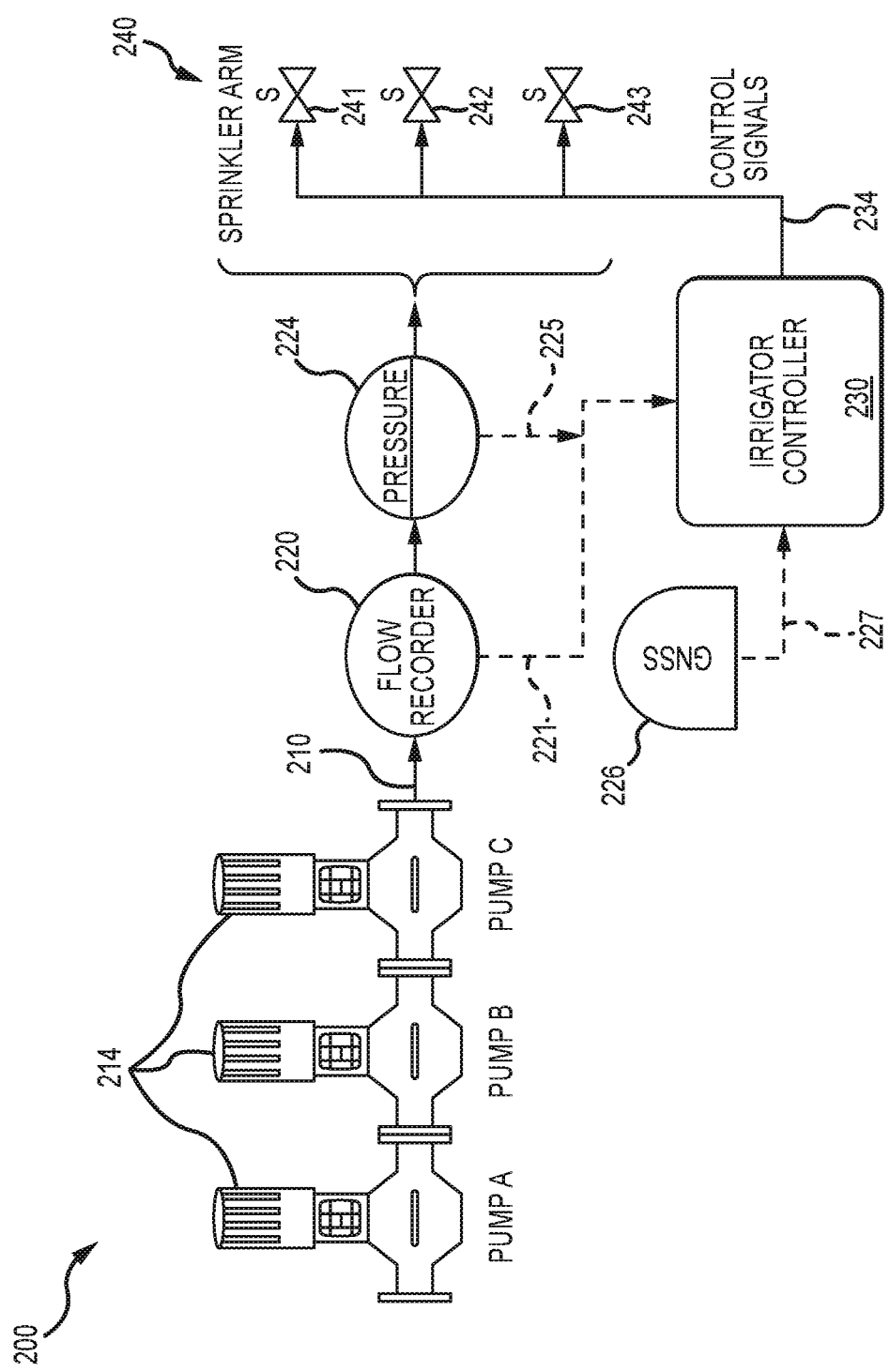
FIG. 2 is a functional block diagram or schematic of a portion of a center pivot irrigation system.

FIG. 2 provides a schematic or functional block diagram of a portion of center pivot irrigation system 200 in a manner that facilitates explanation of operation of the irrigator controller 230 (which may be used for the controller 150 of FIG. 1). As shown, input water 210 that will be used for irrigation during rotation of a sprinkler arm 240 is provided by multiple pumps 214. In practice, the pumps 214 typically will each have a fixed flow rate. The system 200 includes a flow sensor/recorder 220 along with a pressure sensor/gauge 224 on or in the inlet line to the sprinkler arm 240, and the water flow value 221 and pressure value 225 are inputs to the irrigator controller 230. The irrigator controller 230 operates to determine the actual water volume to be output via nozzles (not shown but one nozzle (or more) may be downstream of each solenoid valve 241, 242, 243) of the sprinkler arm 240.

A GNSS receiver (or other position-determination device) 226 provides the current position 227 (e.g., a GNSS position) of the irrigator or sprinkler arm 240. The current arm position 227 of the arm 240 is compared with an irrigation plan to define desired areas of land to be irrigated, e.g., exclusion and irrigation zones present under the arm 240 and, more specifically, under the nozzles in the arm 240 that are individually controlled via signals 234 to solenoid valves 241, 242, 243. In this example, each nozzle on the irrigator or sprinkler arm 240 is controlled by a solenoid valve 241, 242, 243. Each of the nozzles has an expected water flow volume, and the irrigator controller 230 operates to generate the control signals 234 to drive an expected water flow output by opening nozzles to match the required volume.

Figure 3:
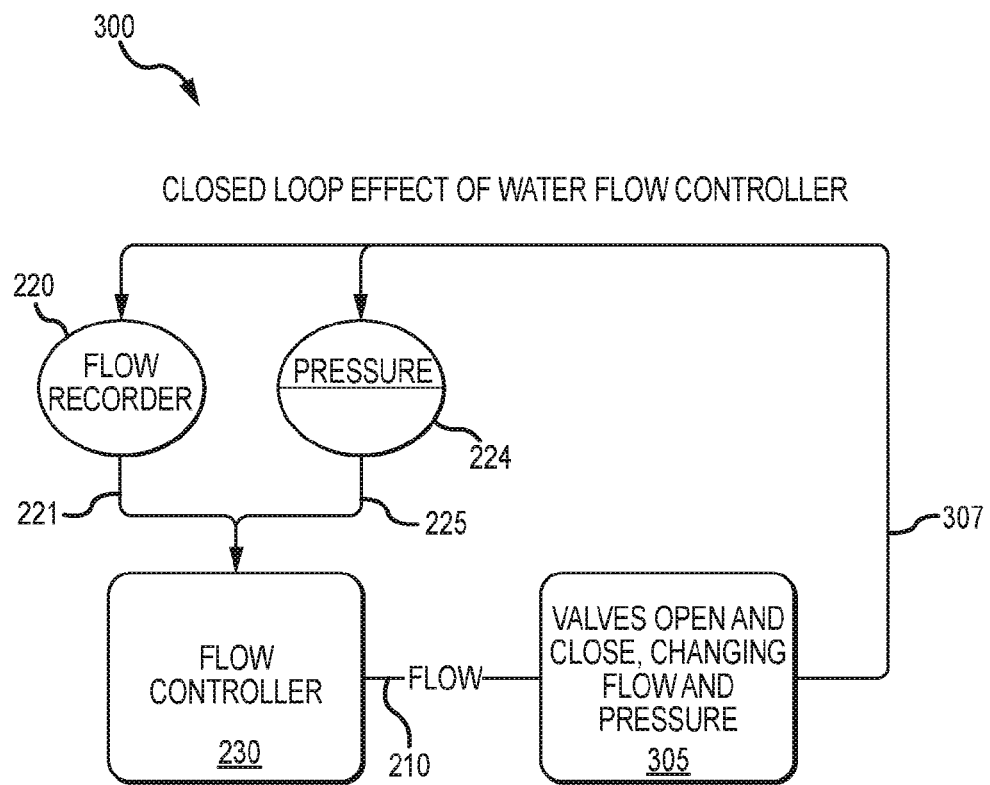
FIG. 3 illustrates schematically a portion of the system of FIG. 2 showing the closed loop effect of the water flow controller of the system.

FIG. 3 illustrates a closed loop 300 provided during the operation of the system 200 of FIG. 2 by the controller 230. Particularly, the controller 230 processes the flow rate data 221 from flow recorder 220 and pressure data 225 from the pressure gauge 224 to determine the flow 210 that needs to be discharged by the irrigator. The controller 230 generates signals to cause, as shown in box 305, the valves to open and close. This can produce a change in flow and pressure as shown by arrow 307. Hence, the controller 230 may be thought of as a closed loop-type controller where changes to the solenoid actuation (e.g., how many and which solenoids 241, 242, 243 are operated to discharge water through downstream nozzles) impacts the ability for water to pass through the pivot irrigator, which impacts water flow and pressure of the irrigation system. In reality or practice, the controller 230 is configured to drive a constant pressure solution, which provides a relatively constant flow solution.

Figure 4:
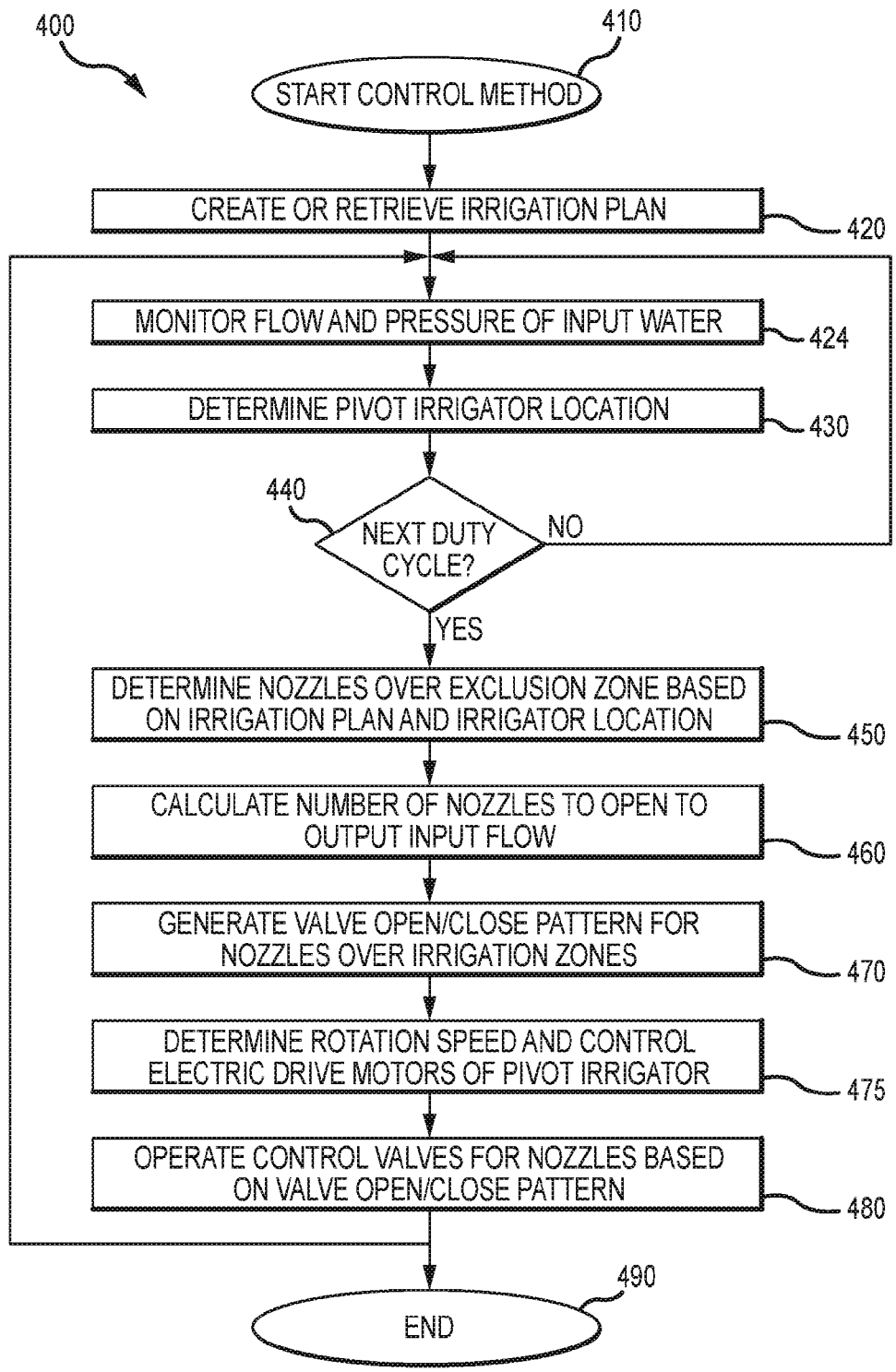
FIG. 4 is a flow diagram of an exemplary flow and placement control method that may be implemented, e.g., by a controller of the systems of FIGS. 1 and 2, to provide more efficient use of water input to an irrigation system.

FIG. 4 illustrates a flow diagram of flow and placement control method 400 that may be implemented by a flow and placement controller (e.g., the controllers of the systems 100 and 200 of FIGS. 1 and 2) during irrigation operations provided by a center pivot irrigation system. The method 400 starts at 410 such as by loading a valve operation module or similar software upon a controller of an irrigation system. Step 410 may also include adapting a pivot irrigator (or sprinkler arm) with a flow meter/recorder, a pressure gauge, and a GNSS receiver (or other location device) and communicatively linking these components with the controller. Further, step 410 may involve communicatively linking drivers/controllers of electric drive motors for the pivot irrigator with the flow and placement controller to allow the controller to set the rotation speed for the pivot irrigator (e.g., based on densities of open valves used for irrigating a portion of the field). Still further, step 410 may involve reconfiguring a pivot irrigator to have over-sized nozzles for an anticipated input flow rate (e.g., so all nozzles do not have to be operated to output the flow and, instead, can be selectively and individually opened/closed (control valves pulsed)) and/or providing control valves (e.g., solenoid valves) that are remotely controllable by the flow and placement controller upstream of each of the nozzles (or pairs or sets of nozzles of a sprinkler head in some cases).

The method 400 continues at 420 with the creation of or retrieval of an irrigation plan for the field in which the pivot irrigator is positioned. The irrigation plan may define an application rate for irrigation zones (i.e., areas of the field that will be irrigated and not in an exclusion zone). Further, the irrigation plan may define one or more exclusion zones where it is desired to apply no (or little) water with the pivot irrigator. For example, a user/farmer may interact with a user interface to the controller to define geographic boundaries of areas or zones in the field that contain obstacles or that have been determined to have lower productivity (or that they otherwise do not want to irrigate). Too much or too little water can affect the quality and yield of a crop. By creating an irrigation plan that optimizes water usage, the user/farmer can maximize their crop's potential to achieve greater profitability. Step 420 may include the user/farmer drawing polygons (via a user interface to controller) on top of a satellite map or soil map of the field to be irrigated to define boundaries of exclusion zones (or of irrigation zones). The irrigation plan may define different (but uniform) application rates for the field for each rotation or for differing times during the growing season. The irrigation plan allows the user to manage exclusion zones to ensure water is not being wasted in areas that do not need it such as roadways or other fixed landmarks. In step 420, the irrigation plan may be sent wirelessly to the controller of the pivot irrigator. Step 420 may include two parts: (a) sending the exclusion zones to the pivot while saving/storing the zones in memory and (b) to start an irrigation process, the desired application depth and starting flow rate are sent to the pivot. In part (b), if the pivot is not already watering, the pivot is instructed to start moving and enable pumps.

The method 400 continues at 424 with monitoring flow and pressure of water being input into the pivot irrigator. Step 430 involves determining the current pivot irrigator location within the field (or within the circularly-shaped area over which the irrigator is rotated) such as via information gathered by a GNSS receiver that is transmitted to the flow and placement controller. The method 400 continues at 440 with determining whether the present duty cycle or valve cycling time period has expired (e.g., has 30 seconds passed (or nearly passed) in some of the examples provided herein), and, if not, the monitoring step 424 and pivot location determination step 430 may be repeated.

If yes at 440, the method 400 continues at 450 with determining which nozzles should be closed because they are currently located over an exclusion zone defined in the irrigation plan. Step 450 may be completed by comparing the current location of the pivot irrigator with one or more exclusion zones' boundaries in the irrigation plan and by determining which lengths or portions of the pivot irrigator (or sprinkler arm) is presently located over the exclusion zone. Then, each nozzle in these lengths or portions of the pivot irrigator can be set "off" during the next duty cycle, and the valve open/close pattern may indicate all these nozzles not to be used. In step 480, control signals can be sent to the solenoid valves associated with these nozzles to close (or keep closed) each of these valves.

The method 400 continues at 460 with a determination of how many of the nozzles in the pivot irrigator should be opened in the next duty cycle to discharge the desired volume of input water (e.g., to retain a relatively uniform flow rate through the pivot irrigator). This determination is made based on the set of nozzles that are not in the exclusion zones, the capacities of these nozzles, and the location of the nozzles (in some cases). Step 460 may include calculating the quantity and the combined flow rate of the valves that are being allowed to irrigate, and, then, calculating the ratio of the input water flow to the combined valve flow rate.

Then, with this number of nozzles known and the combined flow rate thereof, the method 400 continues at 470 with generating the valve open/close pattern for nozzles over the irrigation zone. Initially, the calculated number of nozzles may be randomly or otherwise (e.g., generate a distribution of open valves or operated nozzles may that more evenly staggers the operated nozzles) spread over spans or sections of the pivot irrigator over the irrigation zones. The valves can be selected by starting with the largest valve and working back to the smallest valve (or associated nozzle capacity). The gap between valves is based on the ratio of the total combined flow of the valves that are allowed to be on, based on the irrigation plan (e.g., see step 420), to the input flow rate. For example, if the input flow rate is 500 GPM and the combined flow rate of the nozzles allowed to be on is 1500 GPM, then every third nozzle starting from the largest nozzle will be on. As the ratio is often not a round integer, the spacing is rounded down to the nearest integer for the first pass. The process starts again from the second largest nozzle until the total flow rate of selected nozzles would exceed the input flow rate.

During following cycles, though, it is desirable to obtain a more uniform distribution of output water through each nozzle over an irrigation zone to provide uniform application depths of the water. With this goal in mind, the step 470 may include determining whether a nozzle has been used at least once over a predefined number of duty cycles. For example, the step 470 may require that each nozzle is used at least once every three (or some other number of) duty cycles. In this way, nozzles that were not used for the prior two (or some other number of) duty cycles may be used (their solenoid valves opened) in the next duty cycle. In this way, the valve open/close pattern may be the same or, more often, will differ each duty cycle such that the control method may be thought of as selectively and individually pulsing the solenoid valves that direct flow through the nozzles on the pivot irrigator.

In some implementations, the control method (and controller implementing this method) may maintain a counter for every valve (or every nozzle(s) associated with each valve) and may keep a record of the number of times that the valve would be open. Following the initial valve selection process, subsequent selections give priority to valves based on the number of times they have been allowed to open. The valves with the lowest number of open cycles will be selected first. In practice, this means that any valve could never, or almost never, be more than one cycle behind. Significantly, the control module's logic is designed such that the valves that are over exclusion zones are still included in the selection logic/process by incrementing their counters as if they were irrigating (even though closed or off), but their available volume or flow is not added to the total combined flow rate.

The method 400 then continues at 475 with determining the rotation speed for the pivot irrigator for the next duty cycle. The nozzles have been oversized for the flow but are pulsed on and off so it may be useful to run the pivot irrigator at slower speeds than maximum settings to get equal amount of water applied on the field (e.g., 1 to 2 meters/minute or the like as a maximum and then choose settings or offset from these maximums). Typically, the denser the pattern of valves (or the more nozzles that are being used) the more quickly the pivot irrigator will be rotated to provide more uniform application of water on the field (in the irrigation zone). Then, in step 475, control signals are generated and transmitted to the drives of the electric motors on the wheeled towers of the pivot irrigator to cause these drive motors to rotate the pivot irrigator at the desired rotation speed.

The method 400 continues at 480 with the controller sending control signals to the solenoid valves to open flow to a select set of nozzles as defined by the valve open/close pattern generated in step 470. Step 480 may be a controlled, timed process. Each valve can be instructed in turn in an ordinal process from the center of the pivot outward. The valve is instructed to turn on (or off), and there is a programmed delay (e.g., of 50 to 100 milliseconds with 70 milliseconds used in some cases) between the instruction to each valve to ensure a smooth transition of pressure down the pivot pipe/arm as the valve states change. The method 400 may end at 490 or may continue at steps 424, 430, and 440 (repeat calculations for next valve duty cycle or next irrigation system operating period).

Figure 5:
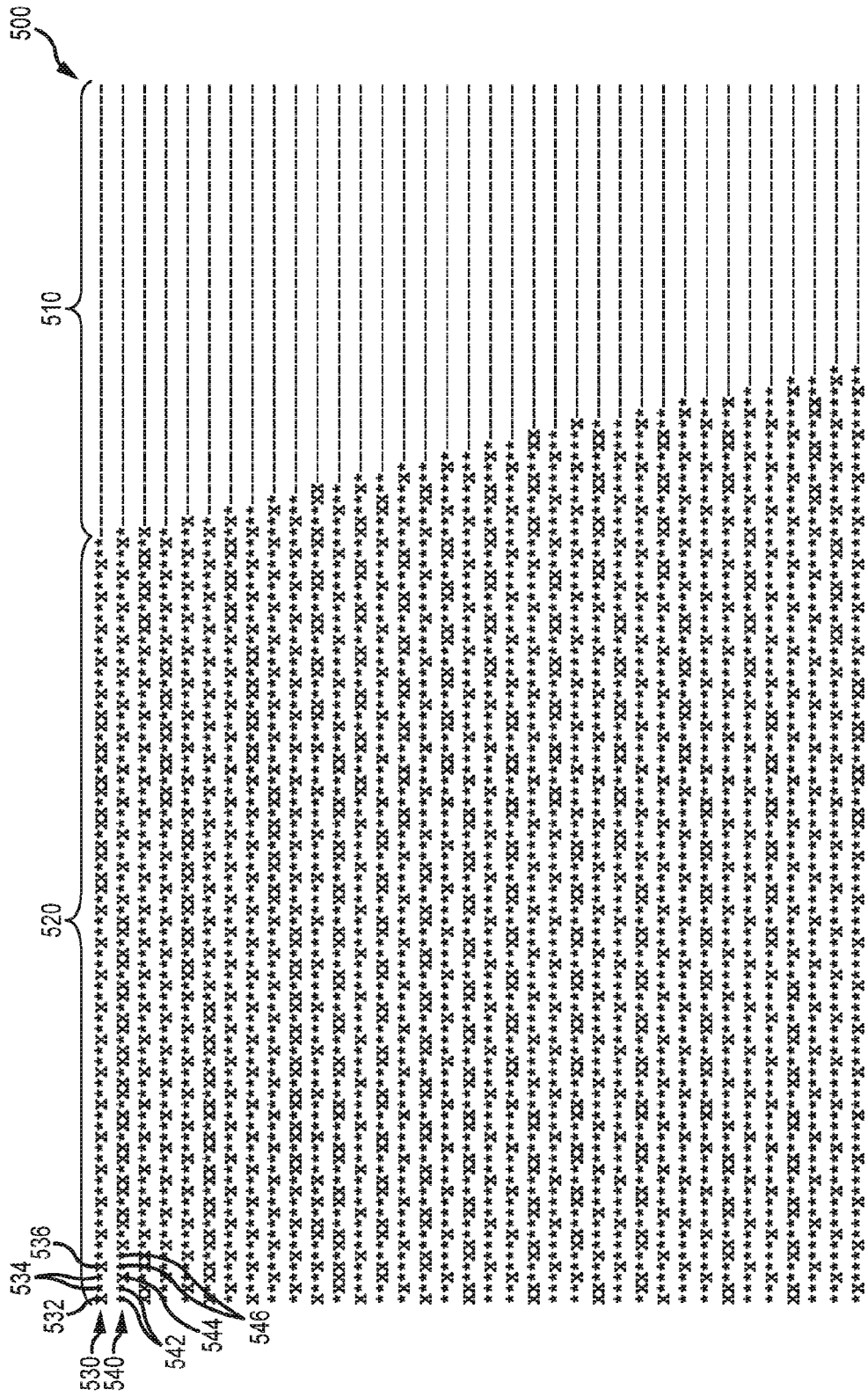
FIG. 5 is a chart or diagram showing valve open/closed patterns for a number of valve duty cycles (or irrigation system operating periods) for an exemplary field and irrigation plan for that field.

FIG. 5 is a chart or diagram 500 showing valve open/close patterns for a number of valve duty cycles (or irrigation system operating periods) for an exemplary field and irrigation plan for that field. Particularly, the rows represent the valve open/close pattern for each successive duty or operating cycle, with each column showing a solenoid valve (which is used to open and close to provide and block flow to at least one nozzle) and with "X" being an open solenoid valve (or water "On" through the nozzle), with "*" representing a closed valve (or valve and water "Off"), and "-" also being a closed valve (or valve/nozzle pair over an exclusion area where it is undesirable to spray water). In this example, an irrigation plan is being implemented by a flow and placement controller that includes an exclusion zone 510 and an irrigation zone 520 (i.e., areas not part of the exclusion zone).

Row 530 provides a first valve open/close pattern with all the valves closed over the exclusion zone 510. In the irrigation zone 520, an outer most valve 532 (which is shown innermost on the chart/graph 500) is open but the next two valves 534 are closed and the fourth outer most valve 536 is again open. This will cause water to flow out of the nozzles associated with valves 532 and 536 and not those associated with valves 534. The pattern provided in row 530 is carried out for one valve duty cycle (or irrigation system operating period). Then, in a next duty cycle, a new valve open/close pattern as shown in row 540 is implemented. In the pattern of row 540, it can be seen that the size of the exclusion zone 510 has changed (e.g., shrunk by the length of the pivot irrigator that includes or is covered by one valve (and one or more associated nozzles)). Hence, the irrigation zone has increased in size (length) and more nozzles can be used to provide the output flow during this next duty cycle. The valve open/close pattern of row 540 differs from that of row 530 with the two outer most valves 542 now being closed, the third outer most valve now being opened, and the fourth outer most valve being closed. By inspecting these two rows 530, 540 and the other rows in the diagram 500, it can be seen that the exclusion zone 510 and irrigation zone 520 can change over time as the pivot irrigator is rotated in a field and to suit a user-defined irrigation plan. Also, it can be seen that the valves are pulsed on and off as the valve open/close pattern changes in each valve duty cycle.

This changing pattern of opened and closed valves changes which nozzles are used to discharge water, which can be used to provide a nearly constant flow rate through a pivot irrigator and also provide relatively uniform application depths being provided across the irrigation zone 520. The valve open/close patterns along with the changing exclusion zone 510 and irrigation zone 520 were used in a test of the control method. The goal flow rate through the pivot irrigator was 1200 liters per minute (LPM), and the results indicated that the actual flow rate or LPMs varied from 1156 LPM to 1233 LPM. While the flow was not exactly uniform, the flow through the pivot irrigator was maintained as a relatively even or "constant" output (e.g., the terms "uniform" and "constant" as used herein should be construed to allow some amount of variance from a target value such as a range of less than about 5 percent about the target value). Additionally, in this test, the speed of the pivot was decreased from about 22 percent of maximum to 16 percent of maximum as the size of the irrigation zone increased (the size of the exclusion zone decreased). This can be restated as the more widely spread the open valves are the slower the pivot irrigator should travel over the irrigated field.

Figure 6:
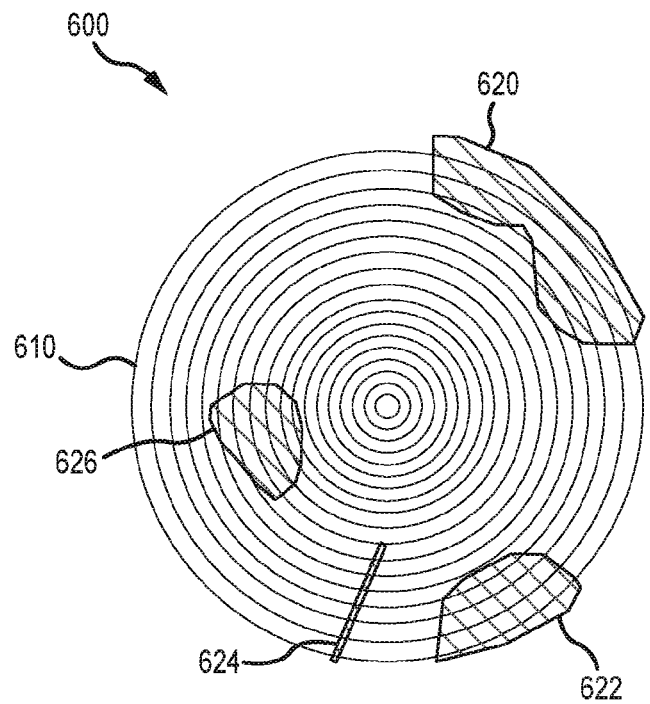
FIGS. 6-8 illustrate a geographical map (e.g., a soil map) for a field to be irrigated with a center pivot irrigation system, an irrigation plan for the field, and a graph showing monitoring of each control valve (and associated nozzles) for a sprinkler arm, respectively.
Figure 7:
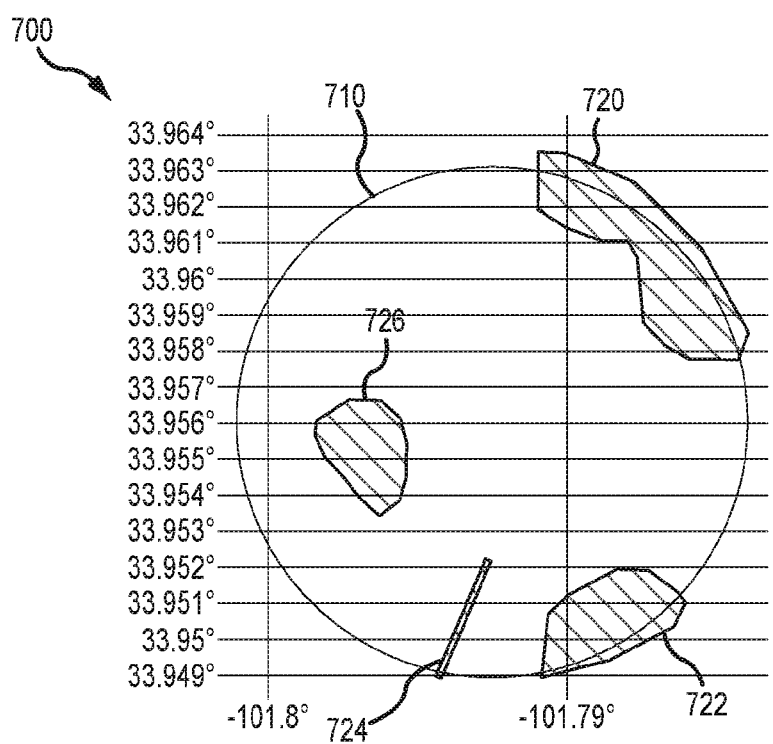
Figure 8:
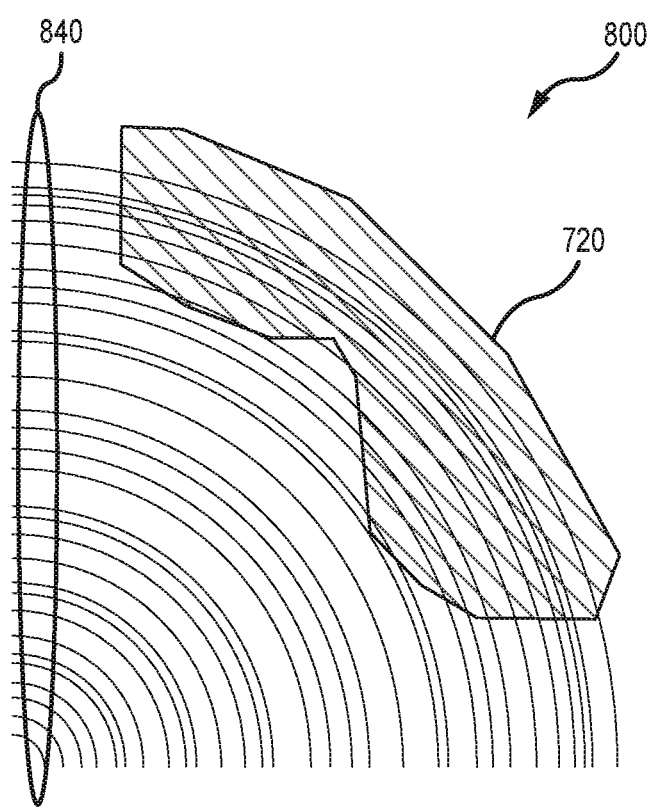

At this point in the description, it may be useful to provide several practical working examples or simulated uses of a center pivot irrigation system with the flow and placement control software used by the system's controller to control operations. FIGS. 6-8 illustrate a geographical map (e.g., a soil map) 600 for a field to be irrigated with a center pivot irrigation system of the present description, an irrigation plan 700 for the field, and a graph 800 showing results of monitoring each control valve (and associated nozzles) for a sprinkler arm, respectively, during irrigation operations. In map/plot 600, a user/farmer has provided input (e.g., the map 600 may be displayed in a controller user interface to the user/farmer) by drawing or generating a set of polygons 620, 622, 624, 626 defining areas of the field that should not be irrigated or "exclusion zones" within the circular area 610 covered by the center pivot irrigator or rotating sprinkler arm. Polygons 620, 622, 626 may provide boundaries for areas of the field that are not productive enough to warrant irrigation or contain natural features preventing planting such as a rock field, a pond, or the like. Polygon 624 may correspond to an obstacle such as a road that also should not be irrigated.

From this map/plot 600, the controller and its software can operate to generate the irrigation plan 700 shown in FIG. 7. In the irrigation plan 700, the geographic coordinates (latitude and longitude values) are provided for the field and, particularly, for the circular irrigated area 710 covered by the pivot irrigator. The geographic boundaries for the four user-defined exclusion zones 720, 722, 724, 726 are also illustrated in the irrigation plan 700. The areas outside these exclusion zones may be considered irrigation zones or areas, and the irrigation plan 700 may also define application depths (or irrigation goals) for the irrigation zones for the whole growing season or for subsets/periods of time within the growing season. The controller for the system can then use the irrigation plan 700 to control valves of the sprinkler arm to not discharge any (or little) water in the exclusion zones 720, 722, 724, 726 and provide uniform application of the "constant" water flow through the sprinkler arm.

Graph 800 shows a large set of lines 840 that can be used to monitor each individual control valve in the sprinkler system as it moves over the irrigated area including over exclusion zone 720. Monitoring of each valve allows the controller to determine that each valve is receiving a proportional amount of the water flowing through the sprinkler arm to better achieve uniform application depths in the field.

In this example, the irrigation system included a pivot irrigator with 247 valves, and each valve controlled flow to two nozzles (e.g., the pivot irrigator has 494 nozzles such as with a sprinkler head with two nozzles being downstream from a solenoid valve that was individually operable by the controller). The total available spray (or water flow) of the pivot irrigator was 5858 LPM (e.g., due to the number of the nozzles and their capacities at design pressures). However, this is an "oversizing" of the nozzles because the goal flow was to run the pivot irrigator at a constant flow rate of 2700 LPM, avoiding the prescribed no spray areas or exclusion zones of the irrigation plan. As shown in graph 800, the first 90 degrees of this exemplary field and irrigation plan 700 includes a kidney shaped exclusion zone 720.

In the following data and graphs, one hundred percent on the pivot speed offset occurs when the actual nozzles under coverage equals 2700 LPM without any flow control management. As the flow is distributed over a larger area, the pivot irrigator is controlled so as to slow down by the inverse proportion. The controller may use a multiplier, e.g., if 1-inch of depth is achieved with this nozzle package at 50 percent speed then a factor of 60 percent can be used by the controller to make the pivot move or rotate at 30 percent of full pivot speed.

Graph 900 illustrates modeled results of the irrigation system, with LPM shown on the Y-axis, as it is rotated at varying speeds and its valves are selectively operated through the first 90 degrees of the circularly shaped irrigated area. The graph 900 is generated from modeling what would happen to an irrigator with a particular irrigation plan, and the before LPM value 920 is the sum of the flow rate of all the valves that are over an irrigated area. In practical terms, it would not be possible to run that much water through the pivot. Graph 1000 illustrates similar modeled results but with offset speed values provided on the Y-axis. The line 920 shows the flow rate (in LPMs) due to no spray areas or exclusion zones when no flow control is applied. In contrast, though, the line 930 shows irrigation of these same areas of the field with flow control (as taught herein) being applied to provide a smoothed flow rate of about 2700 LPM. In FIG. 10, line 1020 represents a ratio of pivot speed that is selected and implemented by the controller and its software to suit the changing nozzle output, e.g., the pivot irrigator is caused to travel faster or at greater rotation speeds when the sprinkler arm is traveling over an exclusion zone (or as the open valve density increases).

In FIGS. 9 and 10, the backgrounds 910, 1010 to these graphs 900, 1000 represents the density of nozzles that are open along the span or length of the sprinkler arm to achieve the constant flow rate shown with line 930. When the entire pivot length is covered, each nozzle is off approximately 54 percent of the time. As the no spray area covers more nozzles, the number of nozzles that are off for flow smoothing reduces, and this results in a denser nozzle spray pattern (as can be seen toward the center of graph 900 in FIG. 9). The density of spray pattern is directly proportional to the speed multiplier of the pivot irrigator as can be seen with line 1020 in graph 1000.

Some interesting wave patterns occur in the required flow distribution when the no spray area/exclusion zone reduces and then soon enlarges again. As the pivot irrigator moves over the portion of the field including exclusion zone 624, the amount of water being reduced by no spray increases as the pivot rotates and the nozzles over the no spray area or exclusion zone becomes progressively larger. Hence, the number of nozzles over irrigation zones and available for discharging the total flow rate (e.g., 2700 LPM) reduces and then quickly rises back up once the no spray area is passed by the sprinkler arm. However, due to the use of over sizing of the nozzles, the flow rate can be maintained at a range about 2700 LPM (e.g., vary about 2700 LPM by no more than 40 to 50 LPM (above and below 2700 LPM)).

FIG. 11 illustrates a graph 1100 similar to the graph 900 of FIG. 9 as the pivot irrigator is rotated over the fourth exclusion zone of the irrigation plan that defines a no spray area (e.g., see area 1120 in graph 1100) in the center of the pivot area. The background pattern 1110 represents the density or pattern of open nozzles (or open valves) along the length of the sprinkler arm, with the inner nozzles being at the top of the graph 1100. An irrigation plan with a no spray area or exclusion zone 1120 (or 726 in FIG. 7) creates some specific control challenges as the distribution of the required flow needs to remain even across both very large capacity nozzles and very small capacity nozzles but without a large set of medium capacity nozzles to help average out the flow requirement. The flow distribution image shown in graph 1100 shows how this can be achieved, with continuously recalculated distribution by the software of the controller as the area 1120 in the center changes shape and its volumetric effect. An even distribution can be maintained throughout the process, with output remaining within a range of about 2650 to 2750 LPM.

Figure 12:
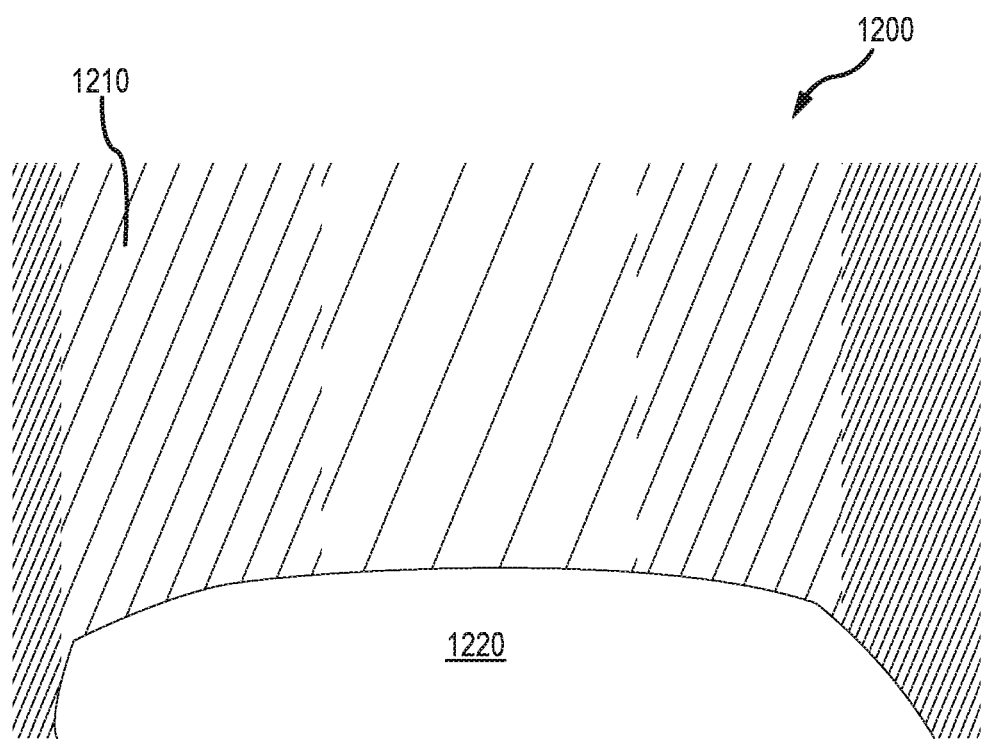
Figure 13:
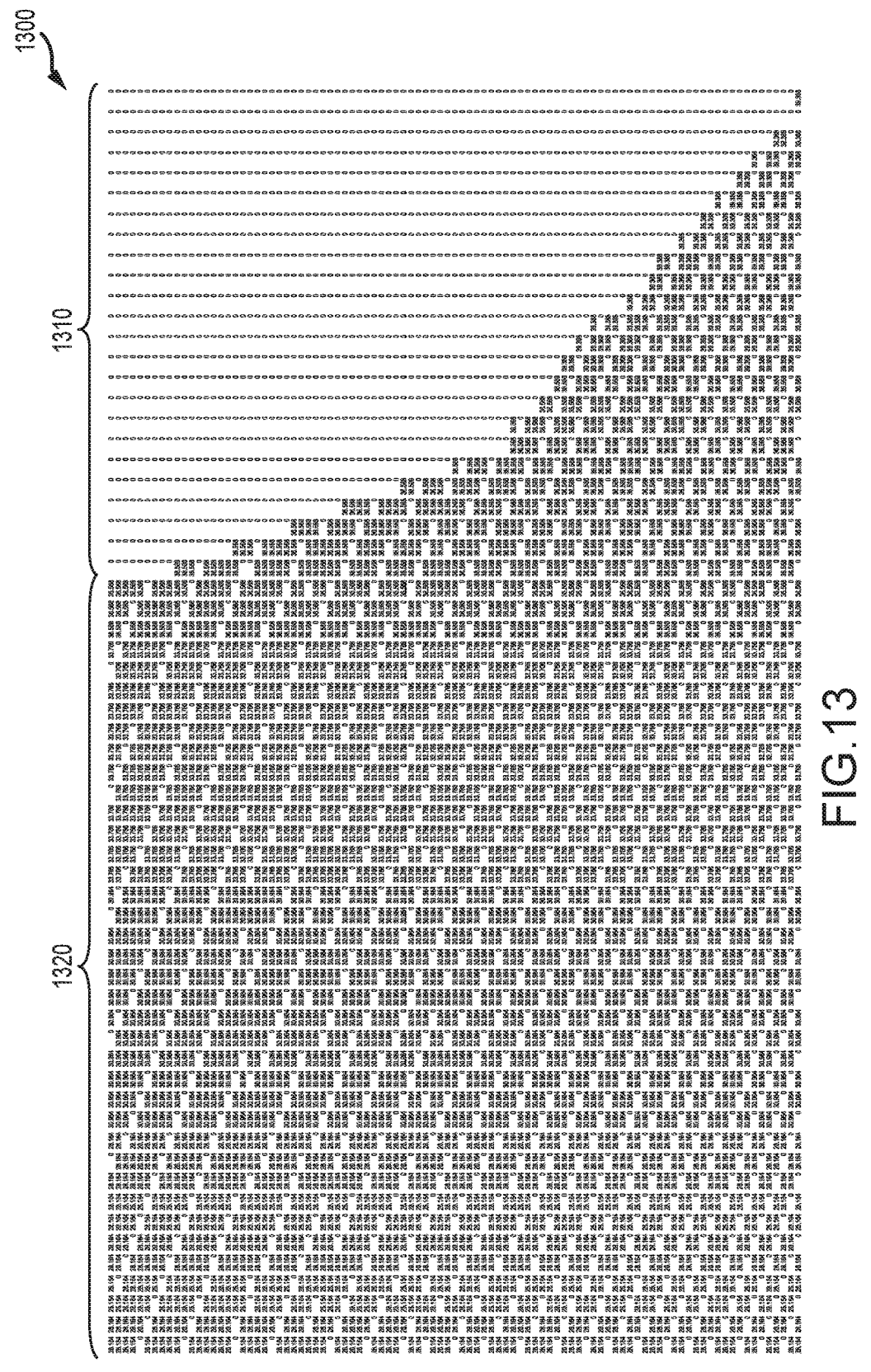

FIGS. 12 and 13 illustrate a graph 1200 similar to the graphs 900 and 1100 showing impact of open valve density across a single evenly-shaped no spray area at the edge of the pivot circle and also shown a graph similar to the graph 500 of FIG. 5. In FIG. 12, the graph 1200 shows a no spray area 1220 and a background pattern 1210 illustrating open valve density as the sprinkler arm rotates over the evenly-shaped no spray area at the edge of the pivot circle. FIG. 13 provides a graph 1300 with rows associated with each valve duty cycle and columns showing the flow rate of each valve when it is open or zero when closed. The no spray area or exclusion zone is shown at 1310 and the irrigation zone shown at 1320.

In this distribution representation, the changing intensity is clear by the distance between the black diagonal lines in graph 1200, which represent areas when valves are closed and nozzles are off (not discharging water). In the center of the no spray area 1220, these lines are quite far apart as, for the most part, all available nozzles for use in irrigating are on (or their control valves are open). As one gets closer to the edges of the no spray area 1220, the black lines in the background pattern 1210 get closer and closer together as the number of valves needing to be opened (or nozzles that need to be on) to maintain the desired uniform flow increases.

The spreadsheet representation or graph 1300 of FIG. 13 highlights at a greater level of detail a small part of this overall distribution calculation as a section of the pivot irrigator or sprinkler arm is leaving the no spray area. Each row represents a cycle of valve pulsing, and each column represents a valve (and a nozzle, a pair of nozzles, or a larger set of nozzles). Higher in the spreadsheet 1300 or in upper rows or early cycles, the nozzles are off only once in every 6 or 7 cycles as there is already enough valves closed in the no spray area 1310 to reduce the total flow rate (e.g., the number of available valves nearly matches the number needed to provide a desired output flow from the pivot irrigator). The rate of overridden or closed valves progressively increased in the later cycles as the pivot irrigator or sprinkler arm is rotated to leave the no spray area 1310. Hence, at the bottom of the spreadsheet 1300 or in later cycles, the nozzles are overridden or off once in about every third cycle.

In another tested or simulated use of a center pivot irrigation system, the sprinkler arm was assumed to have 113 valves available along its span or length for use in distributing a desired uniform flow rate. The flow rates per valve were significantly larger than in the previous example such as 3 LPM nozzles up to 48.7 LPM nozzles, and this pivot irrigator was assumed to have a flow range between 12 LPM and 103.9 LPM. The total flow through all nozzles (if all are open) was assumed to be 6363 LPM, and the goal for control was a total output flow of 2850 LPM. The actual fluctuation was determined to be 2769 LPM to 2849 LPM, while an even distribution of water output was maintained across the nozzles (e.g., each obtained an equal proportion of the available irrigation water). To smooth out the flow rate further may involve sacrificing the distribution across smaller capacity or sized nozzles.

Figure 14:
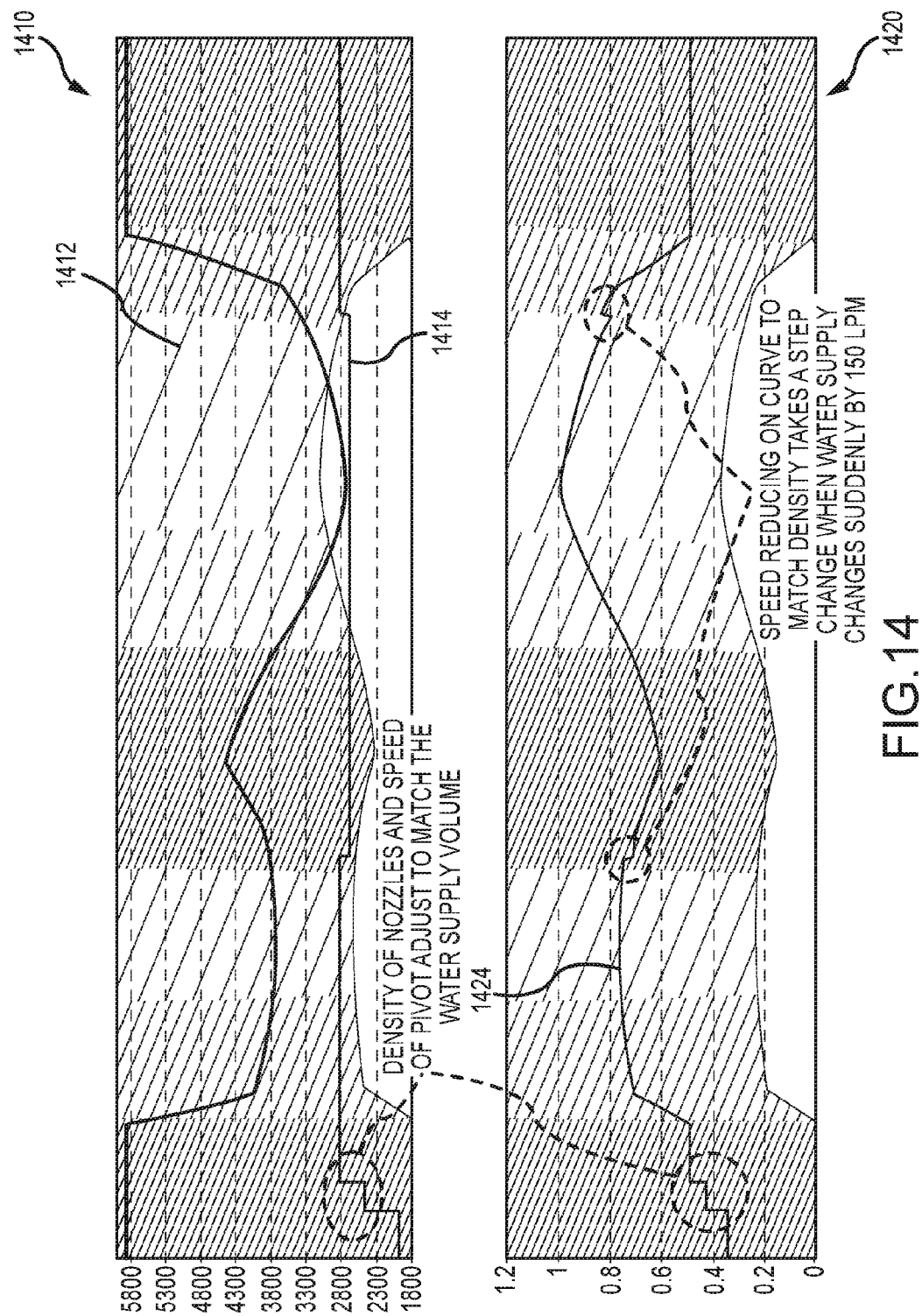
FIG. 14 illustrates a pair of graphs illustrating flow rates and rotation speeds as a sprinkler arm is rotated over a field with an irrigation plan defining an exclusion zone, with FIG. 14 being designed to illustrate the effect on the speed and valve density as the input flow rate of the pivot changes in combination with crossing over the same no spray zone as shown in FIGS. 9 and 10.

FIG. 14 illustrates a pair of graphs 1410, 1420 illustrating flow rates and rotation speeds as a sprinkler arm is rotated over a field with an irrigation plan defining an exclusion zone. Line 1414 of graph 1410 shows the flow rate through the pivot irrigator while line 1424 of graph 1420 shows the rotation speed during the irrigation process. The graphs 1410, 1420 are useful for demonstrating that the control techniques taught herein are useful when flow rates as shown with line 1414 change during irrigation. As seen with line 1424 and background pattern 1412 (showing open valve density), changes in the flow rate 1414 during irrigation is addressed by the controller and its software by varying or modifying both the pivot speed and the nozzle/valve density. These charts or graphs 1410, 1420 highlight some flow changes as well as the impact on speed as the controller adjusts the density of nozzles and speed of the pivot irrigate to match the water supply volume. For example, speed was reduced on curve 1424 to match density 1412 and takes a step change when the water supply suddenly changes by 150 LPM.

Figure 15:
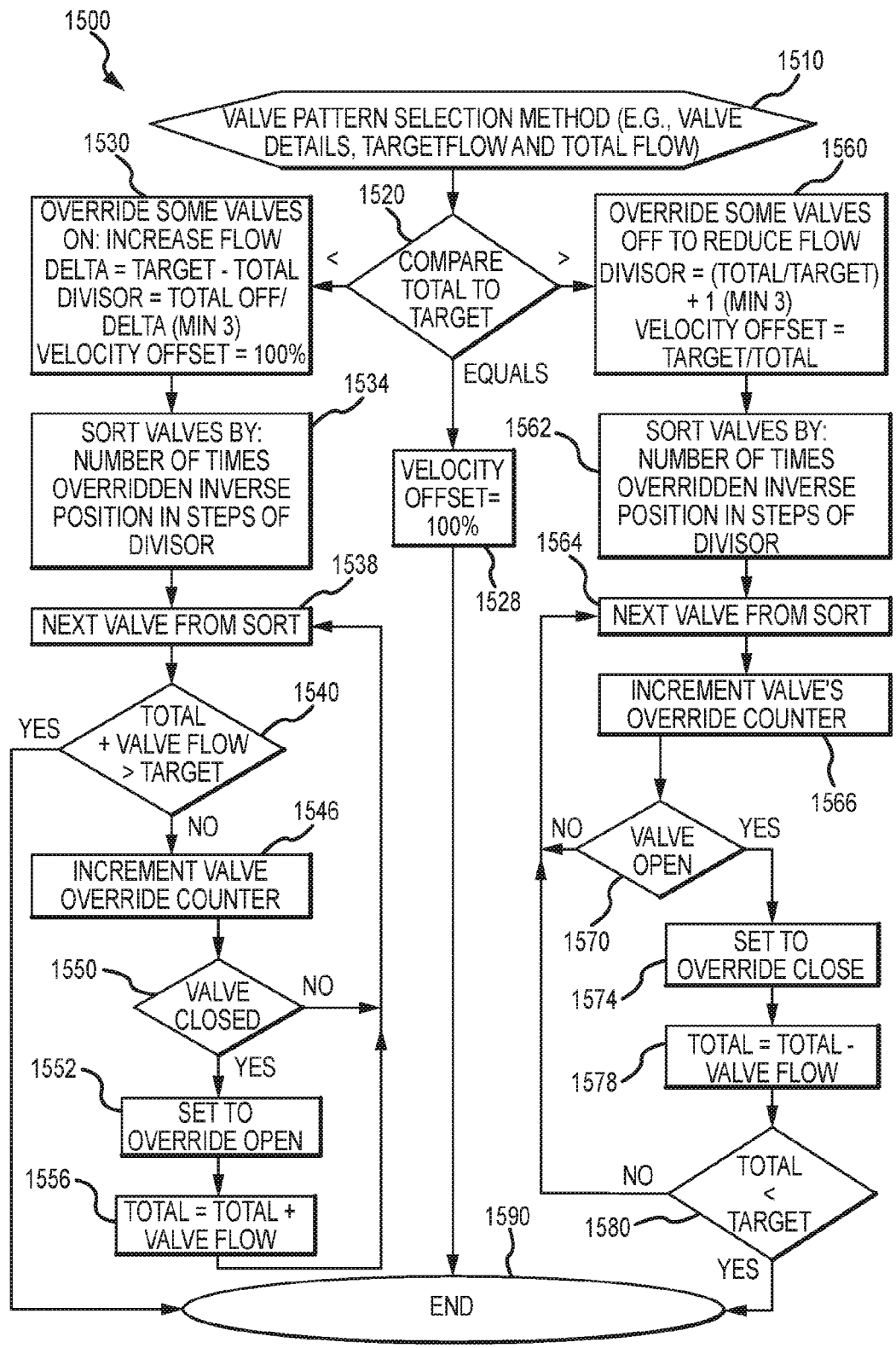
FIG. 15 is a flow diagram of a method of generating a valve pattern for a next duty or operation cycle of an irrigation system, as may be provided as part of the method of FIG. 4.

FIG. 15 is a flow diagram of a method 1500 of generating a valve pattern for a next duty or operation cycle of an irrigation system, as may be provided as part of the method of FIG. 4. The method 1500 starts at 1510 such as with determining, retrieving from memory, or receiving valve detail data (e.g., valve and associated nozzle number and capacity, ordinal location, and actual location along an irrigator arm or pipe span). Step 1510 may also include setting or retrieving a target flow rate through the irrigator or pivot (e.g., through the open or on valves and their associated nozzles), and this step may also include measuring a total flow or determining such flow (e.g., from a pressure reading on the pivot or irrigator).

The method 1500 continues at 1520 with a comparison of the total flow to the target flow. If these are equal (or within some preset range to be "equal" such as within a percentage or within a GPM value such as within 5 to 10 GPM or the like), the method 1500 then proceeds at 1528 with setting the velocity offset at 100 percent and retaining the present valve pattern. The method 1500 may then end at 1590 or be repeated again starting with step 1510.

If, at 1520, the total flow is less than the target flow value, the method 1500 continues at 1530 with overriding some valves to be on (or open flow to associated nozzles) to increase flow through the irrigator or pivot. In step 1530, a delta value is obtained by subtracting the total flow value from the target flow value, and then a "divisor" is calculated by dividing the total number of valves that are off in the present (or prior cycle) valve pattern by the delta value (with a minimum delta of three or the like being set in some cases). Then, in step 1530, a velocity offset is set at 100 percent.

Next, the method 1500 continues at 1534 with sorting valves by (a) number of times the valves have been overridden and (b) by an inverse position in steps of the divisor. At step 1538, a next valve from the sort is identified. The method 1500 then continues at 1540 with determining whether or not the sum of the total flow and the identified valve's flow capacity is greater than the target flow. If yes, the method 1500 may end 1590 or continue again at step 1510 for a next duty cycle. If no at 1540, the method 1500 continues at 1546 with incrementing the identified valve's override counter. Then, at 1550, a determination is made as to whether the identified valve is closed. If not closed, method 1500 returns to step 1538 with identifying a next valve from the recent valve sorting at 1534. If the valve is determined to be closed at 1550, the method continues at 1552 with setting the valve to override to open or to be on (e.g., to be opened upon the transmission of control signals to solenoid valves on the pivot or irrigator to implement the new valve opened/closed pattern). Then, at 1556, the total flow value is reset to be the sum of the prior total flow and the capacity flow of the identified valve (or its associated nozzles), and the method 1500 continues with repeating step 1538.

If, at step 1520, the total flow was determined to be greater than the target flow, the method 1500 would continue with step 1560 involving overriding some valves to off (close flow to associated nozzles) so as to reduce flow through the pivot or irrigator. Step 1560 may include determining a divisor as the sum of the quotient of the total flow divided by the target flow and one (with the divisor having a minimum value such as three in some embodiments of the method 1500). Then, at step 1562, the valves on the sprinkler arm or span of irrigator pipe are sorted by (a) a number of times the valve has been overridden and (b) an inverse position in steps of the divisor. Then at step 1564, a next valve from the sort of step 1562 is identified. At step 1566, the method 1500 continues with incrementing the identified valve's override counter.

At step 1570, a determination is made as to whether the valve identified in step 1564 is open (e.g., is water flowing through its associated nozzles for irrigation?). If the valve is already closed, the method 1500 continues with identifying a next valve at 1564 from the sort of step 1562. If the valve is closed, the method 1500 continues at 1574 with setting override for this valve to close (e.g., to close a solenoid valve associated with one or more nozzles of a known flow capacity). Then, at 1578, the total flow value is updated to be the prior total flow value less the capacity of the valve assigned in step 1574 to be closed during the next duty or operating cycle of the irrigation system. The method 1500 continues at 1580 with a determination of whether the total flow (expected with the new valve pattern) is less than the target flow. If not, additional valves can be identified for closing by repeating step 1564 to identify a possible next valve to close from the sort of step 1564. If yes at 1580, the method 1500 may end at 1590, with the new valve pattern used in a next duty or operating cycle of the irrigation system. The method 1500 may also continue at 1510 with determination of a next valve pattern for an upcoming cycle.

In method 1500, the total flow is the sum of the flow rates of all valves associated with nozzles over an irrigation zone. A total off value is the sum of the flow rates of all valves associated with nozzles that are not over an irrigation zone (e.g., over exclusion zones). An example inverse position in steps of divisor for a sprinkler arm or pipe span with 35 valves (numbered 1 to 35) with divisor of 6 would be: 35, 29, 23, 17, 11, 5, 34, 28, 22, 16, 10, 4, 33, 27, 21, 15, 9, 3, 32, 26, 20, 14, 8, 2, 31, 25, 19, 13, 7, 1, 30, 24, 18, 12, and 6.

The systems described herein, such as center pivot irrigation system 100 of FIG. 1, may be configured to allow a user/farmer to remotely (or locally) monitor and control the irrigation system from any computer, smart phone, tablet, or similar device. The user/farmer can view and monitor irrigation system locations, pivot speed, status (on/off), current voltage usage, current water pressure and/or flow, and more. The user/farmer can remotely control the status (on/off), change the water application rate (prescription) or schedule or irrigation plan, control the material applied, change the direction, and modify or control the pulse rate of the irrigation system. The irrigation system may be configured to provide the user/farmer alerts about system status so they can change the irrigation plan or control irrigators and pumps when they have stopped or encountered errors.

The irrigation system allows the input water to be applied exactly where the user/farmer wants it in their fields. The user/farmer is not limited by the spoke patterns but can perform targeted application of water, fertigation, chemigation, or effluent based on their irrigation plan to apply this "input water" where it matters most. The control of the irrigation system acts to automatically control water application depths based on the irrigation plan, which can be used to account for field variability and crop demands. The control techniques for the irrigation system also control individual nozzles to apply the right depth in the right spot (i.e., not in exclusion zones but, instead, in irrigation zones/areas).

Figure 16:
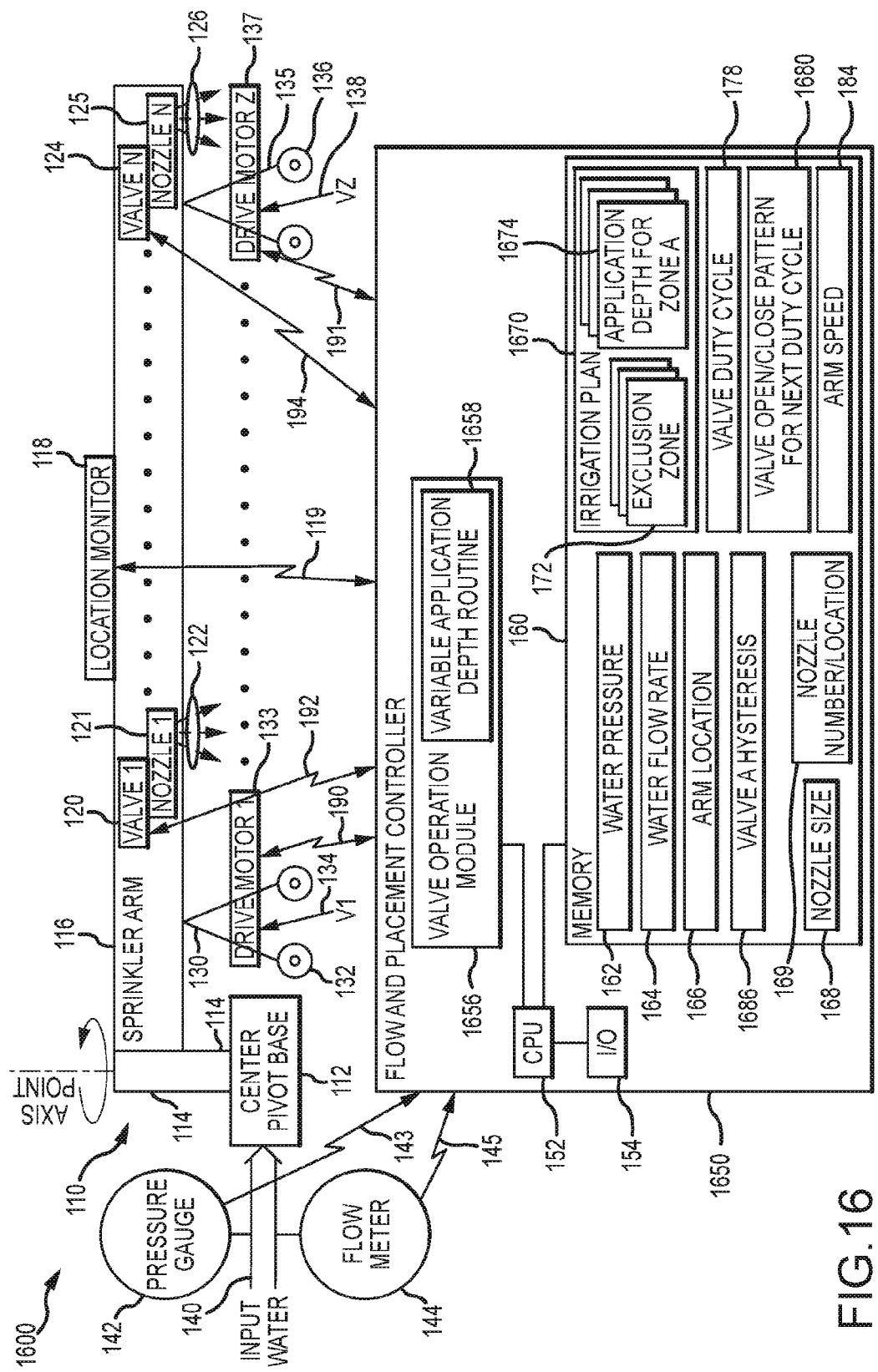
FIG. 16 is a functional block diagram of a center pivot irrigation system similar to that of FIG. 1 but with a new flow and placement controller of the present description configured with a variable application depth module or routine to apply two or more application depths in two or more zones as defined in an irrigation plan.

With this understanding of a uniform flow-based controller in mind, it will be easier to fully understand a center pivot irrigation system of the present description that uses a flow and placement (or VRI) controller (and associated control process) to provide variable depth application zones to an irrigation plan. FIG. 16 illustrates a center pivot irrigation system 1600 of the present description that includes many of the components described for system 100 of FIG. 1, and these components are labeled with like reference numbers with the prior description being relevant to their implementation and operations in system 1600.

The system 1600 differs from system 100, though, as it includes a unique flow and placement controller 1650 adapted particularly to carry out the control processes described herein to provide a controlled variable rate of application to two or more user-defined areas or zones of a field (area under the sprinkler arm 116). To this end, the controller 1650 includes a valve operation module 1656 that is operable to implement an irrigation plan 1670 with one or more exclusion (or no spray) zones 172 identified by a user (e.g., a farmer) for the field or land under the sprinkler arm 116 during its rotation about the center pivot base 112.

Further, though, the irrigation plan 1670 includes definitions as shown at 1674 of two or more application depths for two or more areas or zones in the field (or of two or more variable rate irrigation zones with application depths assigned to each of these zones (or accepting default or 100 percent)). This may be a first application depth (e.g., a default rate of 100 percent application depth) and a second application depth (e.g., a fraction or percentage of the 100 percent application depth) such as in an area of the field with soil that is better at retaining more moisture or in which a crop has been planted that required less moisture (throughout the growing season or at particular times as the application depths for each zone may be varied throughout the season too and do not have to be fixed for the entire season). To this end, the valve operation module 1656 includes a variable application depth routine or module 1658 that processes the irrigation plan 1670 along with other parameters stored in memory 160 (such as water pressure 162, water flow rate 164, arm locations 166, nozzle sizes 168, nozzle number and location 169, and a hysteresis 1686 for each valve 120, 124 on the sprinkler arm 116 as explained in detail below) to calculate or generate a pulsing pattern or valve open/close pattern 1680 (and/or an arm speed 184) for each duty cycle 178 to provide the desired application depths 1674 (as well as no spray in zones 172). The control process implemented by routine/module 1658 is described in detail below.

Figure 17:
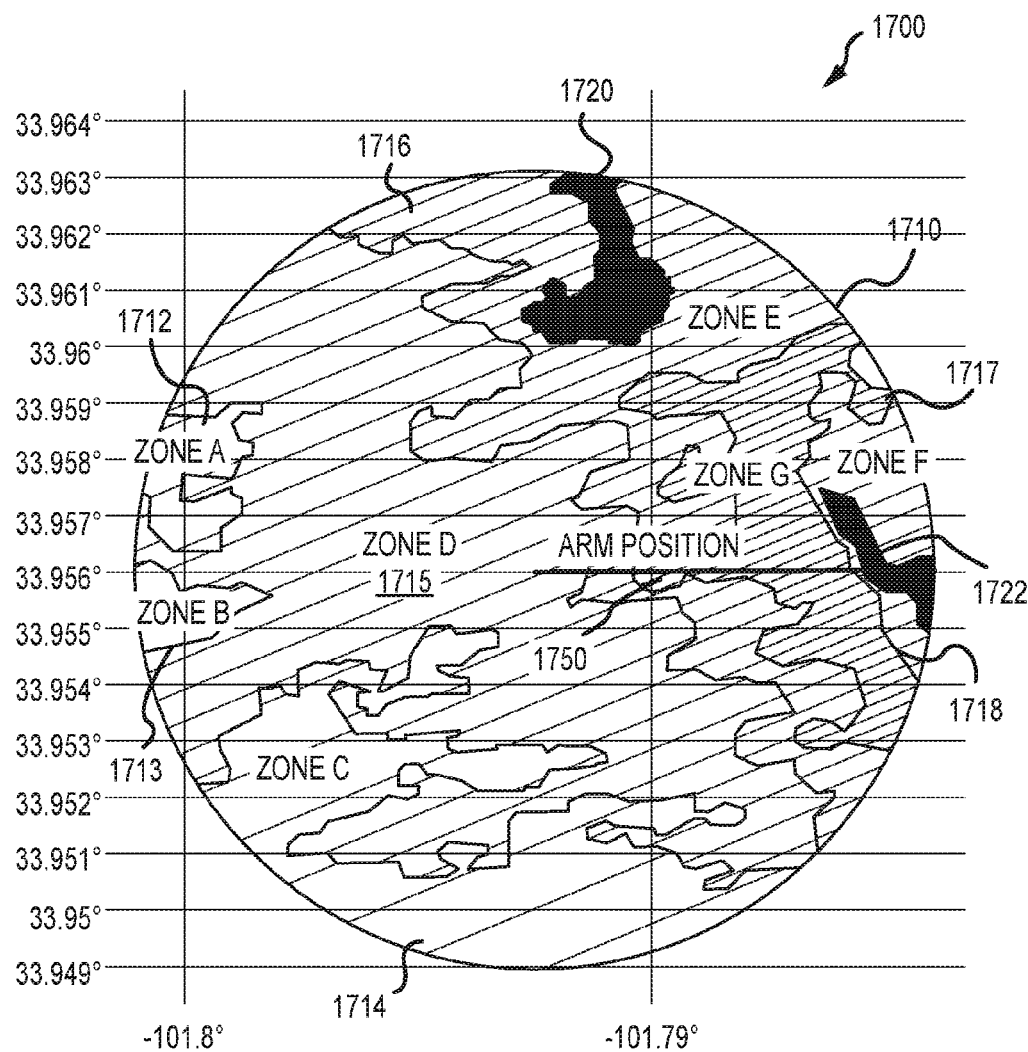
FIG. 17 illustrates, similar to FIG. 7, an irrigation plan for a field to be irrigated by a center pivot irrigation system of the present description showing an example of a user-defined set of irrigation zones with differing application depths (and including exclusion zones in this non-limiting example)

FIG. 17 illustrates, similar to FIG. 7, an irrigation plan 1700 for a field to be irrigated by a center pivot irrigation system of the present description (such as system 1600 of FIG. 16). From a map/plot (such as shown at 600 in FIG. 6), the controller and its software can operate to generate the irrigation plan 1700 shown in FIG. 17. In the irrigation plan 1700, the geographic coordinates (latitude and longitude values) are provided for the field and, particularly, for the circular irrigated area 1710 covered by the pivot irrigator (with an example arm position shown at 1750). The geographic boundaries for two exclusion zones 1720, 1722 are also illustrated in the irrigation plan 1700 (similar to defining of zones 720, 722, 724, 726 for no or little application as discussed with reference to FIG. 7).

The areas outside these exclusion zones may be considered irrigation zones or areas, and the irrigation plan 1700 may also define different or variable application depths (or unique irrigation goals) for a plurality of irrigation zones (e.g., typically two or more) for the whole growing season or for subsets/periods of time within the growing season. This can be seen with a first irrigation zone 1712 (or "Zone A"), second irrigation zone 1713 (or "Zone B"), third irrigation zone 1714 (or "Zone C"), fourth irrigation zone 1715 (or "Zone D"), fifth irrigation zone 1716 (or "Zone E"), sixth irrigation zone 1717 (or "Zone F"), and seventh irrigation zone 1718 (or "Zone G") covering the rest of the field or geographic area 1710 not included in exclusion or no spray zones 1720, 1722. The geographic boundaries of the zones 1712-1718 are well defined in the irrigation plan (e.g., by the location of boundaries (e.g., polygons with a shape, size, and location by the user/farmer via a GUI) or using measured geographic coordinates).

The controller for the system uses the irrigation plan 1700 to control valves of the sprinkler arm to not discharge any (or little) water in the exclusion zones 1720, 1722 and provide uniform application of the "constant" water flow through the sprinkler arm at a first rate to provide a first depth (or light depth as labeled in FIG. 17) in the first, second and third zones (Zones A, B, and C) 1712, 1713, 1714, at a second rate to provide a second depth (or medium depth) differing from the first depth in the fourth zone (Zone D) 1715, at a third rate to provide a third depth (or heavy depth) differing from the first and second depths in the fifth and sixth zones (Zones E and F) 1716 and 1717, and at a fourth rate to provide a fourth depth (or full depth) differing from the first, second, and third depths in the seventh zone (Zone G) 1718.

As can be seen, the complexity involved with the VRI control (e.g., as provided controller 1650 in FIG. 16) occurs in part because the VRI zones (such as zones 1712-1718) can be irregular such as polygons. Hence, there can be multiple depths of application under the arm of the irrigator at any point in time. This can be seen in graph 1700 where the pivot is shown as a circle overlaid upon a soil map. With the pivot arm at a bearing of 90 degrees as shown at 1750, the arm and its nozzles are concurrently covering three different depths (medium, heavy, and full in this example) assigned to the fourth, fifth, sixth, and seventh irrigation zones (e.g., four defined irrigation zones with three application depths assigned) 1715, 1716, 1717, and 1718 as well as an exclusion zone 1722. This type of control may have many uses including allowing a farmer to grow differing crops in a geographic area serviced by a single center pivot irrigation system, to apply differing amounts of water to zones known to have differing types of soil (differing runoff considerations and the like), and/or to meet other goals of the user of the irrigation system.

As discussed with regard to the uniform depth controller 150 of system 100 of FIG. 1, in some locations, the input flow rate to a pivot can vary significantly over a single growing or irrigation season. Early in the season, the aquifers or other water supplies may be very full and allow for a high flow rate of water to be supplied to the pivot. Later in the season, though, there may be less water available resulting in a lower flow rate of water supplied to the pivot (e.g., the input water 140 may be provided at a lower flow rate in system 1600 of FIG. 16). Due to various factors including cavitation of pump impellers, alternative demand on the pump supply, and one of the pumps in a set turning on or off, the delivery of water flow from a pumping station/assembly or other water delivery solution for a center pivot irrigation system (such as system 1600) may even fluctuate significantly during each day of the growing or irrigation season.

This flow rate fluctuation is not suitable for typical pivot irrigation. A pivot irrigator is fitted with a set of nozzles that are designed to provide a set depth of application of water to the ground. In order for this to work, the combined total flow rate of all the nozzles needs to be consistently supplied to the center pivot irrigator. Too much water results in too high of a water pressure, which results in an unpredictable output as well as, in some cases, structural damage including burst water pipes. Too little water results in the outer spans of the center pivot irrigator (or its sprinkler arm) not receiving enough water to spray correctly. Either of these two water flow situations results in higher costs to the farmer using the center pivot irrigator along with lower crop output.

The uniform flow control method described above (e.g., with regard to operations of the controllers 150 and 230 with reference to the method 400 in FIG. 4) helps to mitigate this issue. The uniform flow control method provides a solution that involves continuously monitoring the pressure of the water at the base of the pivot irrigator and then using this pressure to determine a likely flow rate of water that can be (and needs to be) dispersed from the nozzles of the sprinkler arm. In the uniform flow-based center pivot irrigation systems, a significantly oversized nozzle package is applied to the pivot along with solenoid valves and controllers. One or more nozzles can be controlled by each solenoid valve. While many irrigators or farmers (e.g., users of these systems) have a valve on every single nozzle, some have a pair of nozzles on each valve.

By controlling the operation of the solenoid valves, the controller can ensure that the flow rate of water from the nozzles equates to the flow rate of water available to the pivot. The control process described to provide uniform flow from the nozzles ensured that the delivery of water to the land below the sprinkler arm equated to a prescribed depth (e.g., a uniform depth throughout the covered land/field). This was done by ensuring that every valve had the same opportunity to water and by controlling the speed of the irrigator's rotation. The faster the irrigator rotates, the lower the application of water, and the slower the irrigator rotates, the higher the application of water. By relating the speed of rotation to the proportion of solenoid valves that could be on at any time, the uniform flow controller was able to ensure consistent or uniform application depth. One drawback of such a controller is that it does not allow variable depths of irrigation across the land under the center pivot irrigation system.

With reference again to the control method 400 of FIG. 4, it may be useful to discuss how different the new variable rate application control method is by explaining how the method 400 may be modified for implementation by a VRI system such as by the variable application depth routine 1658 of controller 1650 in FIG. 16. The main changes that a flow and placement controller would implement to achieve variable rate application (e.g., by the controller 1650 or a modified controller 230 shown in FIG. 3) takes place in steps 450 to 475 in the method 400 including selecting which valves can spray water and when. This new VRI control method maintains control over how often each valve along a sprinkler arm can water in order to control uniformity (e.g., in the flow through the arm) but also allowing variable depths of irrigation across the land under the center pivot irrigator's sprinkler arm.

For a VRI method 400, the method of FIG. 4 would involve at 450 determining the proportional application rate of each valve based on the irrigation plan and irrigator location. As discussed above, the irrigation plan may include exclusion zones, fully irrigated zones, and variable depth irrigation zones (e.g., zones with less than 100 percent application). While the uniform depth method 400 determined velocity as the final step 475, in order to calculate variable rate irrigation, it is helpful to determine the velocity before determining the valve open and close pattern (for the next duty cycle). This is because the velocity of the pivot is directly related to how many cycles of a valve pulsing need to be considered when calculating the irrigated depth. At step 460 of the VRI method 400, the ratio between the input flow water and the total volume of water is determined that would be output based on the selection made at prior step 450.

The determination of velocity of rotation relates to the average flow rate of all valves based on their required variable rates. For example, if all zones are irrigating at full depth and half the valves that need to be on are overridden to close in order to reduce the total flow rate, then the pivot needs to run at half its prescribed velocity in order to maintain depth. However, if those zones needed to irrigate at only half depth, then the irrigator could run at its prescribed velocity. The combination of the various depths of irrigation, the number of valves covering each depth zone, and the proportion of those valves that have been overridden to close is used to determine the actual variation to the prescribed velocity (design or preset "maximum" velocity or 100 percent velocity setting) of the irrigator.

The VRI control (or flow and placement control) method implemented with a variable application depth routine/module 1658 of the present description may vary while still providing control over a center pivot irrigator to provide variable depth application. In one example, though, the inventor recognized that it would be desirable to design the VRI control method to prevent the need for continual changes in the rotational velocity of the irrigator (e.g., do not want to change the velocity each duty cycle). To this end, the VRI control method implements an averaging approach. Specifically, in one exemplary implementation, the total average flow (or "Average VRIFlow") is determined as the cumulative sum of the average flow rate of all the nozzles on the irrigator (along the sprinkler arm). The average flow rate for each nozzle is taken as the actual flow rate of the nozzle multiplied by its variable rate percentage.

The calculation for percentage variation to velocity is, therefore, simply the input water flow (or "InputWaterFlow") divided by the total average flow (Average VRIFlow). The exception to this calculation is when the total available input water exceeds the total average flow (Average VRIFlow). In such a case, the irrigator cannot be controlled so as to run at a velocity faster than its preset maximum velocity (or 100 percent velocity). In this case, then, the velocity is set to 100 percent. For example, the calculations may indicate a velocity of 67 percent when the total average flow rate is 3000 LPM and the input water flow is 2000 LPM. In contrast, the velocity may be set at 100 percent (or maximum irrigator velocity) when the total average flow rate is 3000 LPM while the input water flow is 4000 LPM.

Referring again to FIG. 4 and how to modify this method 400 to provide a VRI control method, at step 460, the number of cycles for valve pulsing that need to be considered when calculating the irrigated depth is determined. The more cycles that can be averaged for "on" or "off" ratios, the more hysteresis can be used in the VRI control method, which can lead to a more accurate generation of the variable rate depth allocation. For example, 30 seconds may be used as a duty cycle or period for a valve to be on or off. The typical pivot irrigator moves its fastest tower at about 2 meters per minute at 100 percent or maximum velocity (or its highest rotations rate or arm speed). The typical radius of throw of a nozzle on a pivot irrigator is about 6 meters. Therefore, any piece of land will be under the irrigator's sprinkler arm for just under 3 minutes at this velocity, and only six cycles of pulsing hysteresis would be considered valid in this example. When the pivot irrigator is traveling at only 10 percent velocity, though, the VRI controller method may consider up to 60 cycles of pulsing hysteresis valid. Memory optimization may also be taken into account, and the inventor in prototyping determined it may be useful in the valve pattern calculations to provide variable rate application to limit hysteresis to 32 cycles (e.g., remember last 32 cycles and use cycles of 15 seconds).

In considering the modification of method 400 for variable depth application, step 470 involves the generation of the valve open and closed pattern for the nozzles over the irrigation zones. This step is performed very differently in the VRI control method as discussed in detail below. At step 475 of a VRI control method, the determination of proportional difference to velocity of rotation would have already occurred as discussed above. As a result, at step 475 of a VRI control method, the final rotation velocity is determined as a combination of proportional velocity and the required overall depth of application. Note, the velocity or arm speed is a relatively important parameter to properly controlling the center pivot sprinkler system to provide variable depth application. The determined final rotation velocity is then applied to control the drive motors of the pivot irrigator.

Figure 18:
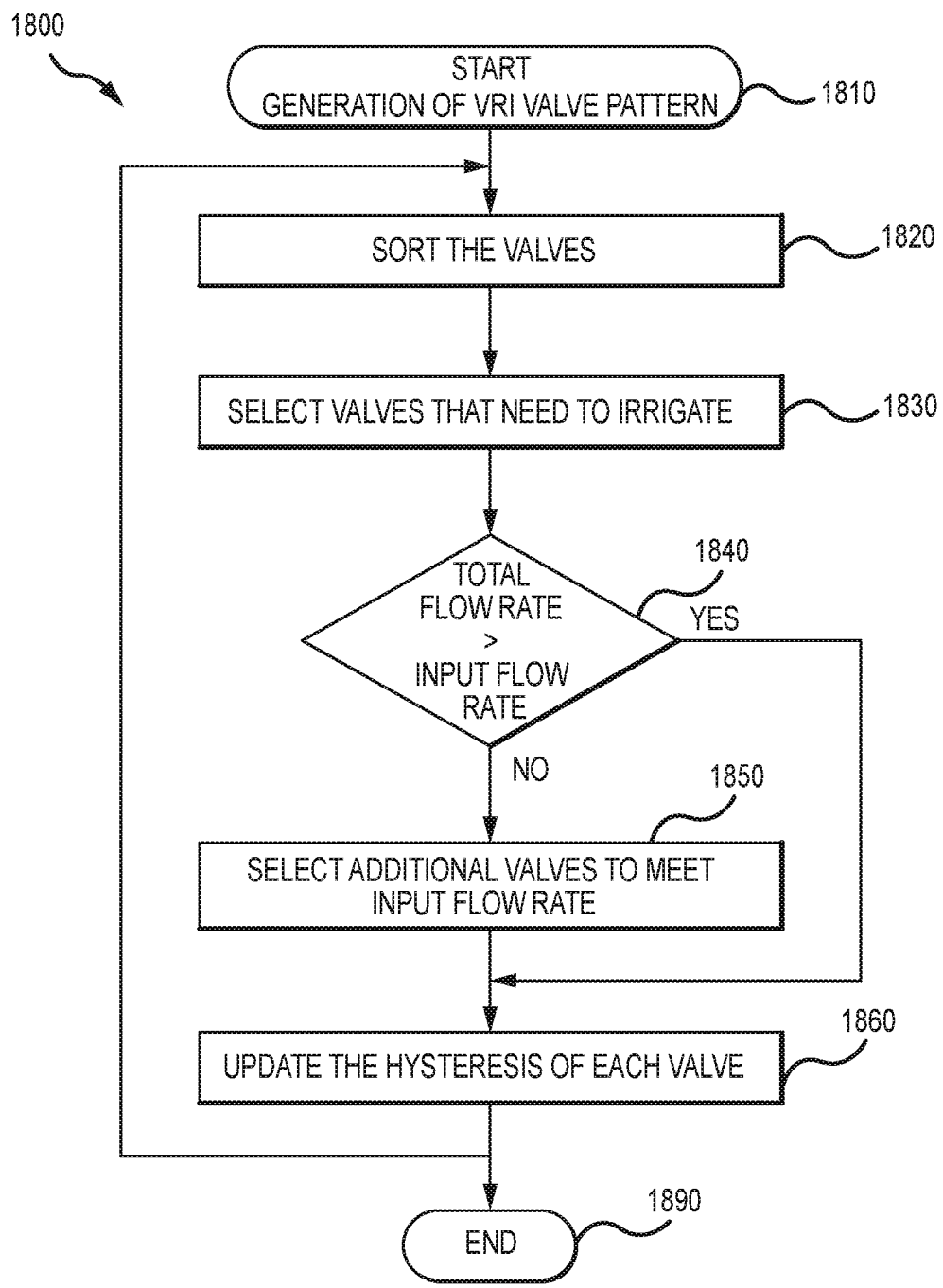
FIG. 18 illustrates a flow diagram showing the four steps or phases of generating a valve open/close pattern for use in controlling a center pivot irrigation system to provide variable depth application (with exclusion zones) in an area of land under a sprinkler arm (e.g., the flow diagram provides an overview of the valve selection (step 1990 in FIG. 19))

At this point in the discussion of a VRI control method, it may be useful to more fully describe how to generate the valve open/close pattern for a next duty cycle (e.g., how to perform step 470 to modify the method 400 for non-uniform depth irrigation of the zones/areas under the sprinkler arm). Particularly, FIG. 18 illustrates a flow diagram of a method 1800 of generating a valve open/close pattern for use in controlling a center pivot irrigation system to provide variable depth application (with exclusion zones) in an area of land under a sprinkler arm. The method 1800 starts at 1810 such as with loading and running software on a flow and placement controller, such as in the form of the routine/module 1658 in FIG. 16, of a center pivot irrigator or irrigation system (e.g., system 1600 of FIG. 16).

The method 1800 may be considered to include four main steps or phases: step 1820 involving sorting the valves; step 1830 involving selecting valves that need to irrigate in a next duty cycle; step 1850 involving selecting additional valves to meet the input flow rate (with this third phase only being performed if at step 1840 the method 1800 determines that the total flow rate does not yet exceed the input flow rate; and step 1860 involving updating the hysteresis of each valve. Then, these steps/phases may be repeated as shown or the method 1800 may end at 1890. The generated valve open/close pattern from step 1830 or 1850 is used by the flow and placement controller to generate solenoid valve control signals as discussed with reference to the system 1600 of FIG. 16 (with reference back to system 100 of FIG. 1).

One goal of the method 1800 is to try to distribute the open valves across the entire pivot arm, with it being understood that this may be complicated and/or limited when there are exclusion zones. Further, a proportional velocity has been (or will be) determined as well as the level of hysteresis, and these values are used to determine whether each valve of a sprinkler arm needs to be on in the next duty cycle to meet that valve's application depth requirement or to ensure that the volume of water output is the same as the volume of water input. Step 1820 is performed by the controller (and/or its hardware and software) to sort the valves such that the distribution of irrigating (or open) valves is relatively even across the length of the irrigator's sprinkler arm. This is desirable to ensure that a similar volume of water is being output by all sections of the sprinkler arm in each duty cycle. This also minimizes pressure changes within the pivot, limits issues with water hammer, and reduces or minimizes pressure spikes at the base of the pivot.

Step 1830 involves selecting valves that need to irrigate in the next duty cycle in order to meet the desired application amount or level within an even pulsing cycle for that valve. This selection process may exclude a valve if the total flow rate of nozzles connected to all valves selected would be greater than the input flow rate. However, any valves excluded on this basis may receive a priority of water in the next duty cycle. If at 1840 it is determined that the input flow rate has not been reached by the selected valves of step 1830, additional valves are selected at 1850 with those valves having the greatest need for water being chosen first until the flow rate of the valves selected meets (or exceeds) the input flow rate. Then, in step 1860, the hysteresis is updated for each valve to record which valves have been set to open in this next upcoming duty cycle of the irrigation system.

The following provides working or implementation examples of each of these four phases or steps 1820, 1830, 1850, and 1860. These examples are then followed by a discussion of more detailed flow or steps for executing the first three phases with reference to the flow diagrams of these three phases/processes 1900, 2000, and 2100 with reference to FIGS. 19-21.

Turning to the first phase (or step 1820) or the sorting of the valves on a sprinkler arm, unlike the uniform flow control method, it does not make sense to simply sort the valves based on the most likely modulus that provides an even spread of valves based on the speed of the pivot. This is because each valve will have a variable pulsing rate, and there is unlikely a common modulus. It is important to ensure that the result does not cause a cluster of selected valves at any one area of the sprinkler arm. For example, if one were to simply select every third valve, it would be very likely produce a pattern with a section of the sprinkler arm having two out of every three valves selected and another section of the sprinkler arm with only one out of three selected. This would undesirably result in a significant imbalance of water allocation between sequential duty cycles.

Nozzles are controlled by valves, and each valve can be only on or off regardless of how many nozzles are attached to it (or downstream of it). The inventor discovered that the most even distribution across the pivot or along the length of a sprinkler arm was produced by the controller by using the valve position number. Then, the larger nozzles are generally selected before the smaller nozzles (which have higher valve numbers when numbered from the center pivot base or inner portions of the sprinkler arm outward). The sorting may start with the highest valve number that divides evenly (or cleanly) by an integer greater than 3 such as 9. In this example, every ninth valve is selected in each pass. The starting valve is shifted by a predefined shift valve (an integer) for each pass with one useful example shifting by three for each pass.

The following is an example of performing the sorting step or phase for a pivot/arm with 494 nozzles that are controlled by 247 valves (e.g., a pair of nozzles controlled by each solenoid valve). The largest multiple of 9 is 243 in this example so the sorting starts with the valve having this number/identifier. Then, every multiple in reducing order is selected until we reach the valve numbered 9 itself, with the results of this first sorting step being the following valve numbers: 243, 234, 225, 216, 207, 198, 189, 180, 171, 162, 153, 144, 135, 126, 117, 108, 99, 90, 81, 72, 63, 54, 45, 36, 27, 18, 9. Then, next pass starts three higher than the previous pass for the following resulting selections on each pass: (Pass 2) 246, 237, 228, 219, 210, 201, 192, 183, 174, 165, 156, 147, 138, 129, 120, 111, 102, 93, 84, 75, 66, 57, 48, 39, 30, 21, 12, 3; (Pass 3) 240, 231, 222, 213, 204, 195, 186, 177, 168, 159, 150, 141, 132, 123, 114, 105, 96, 87, 78, 69, 60, 51, 42, 33, 24, 15, 6; (Pass 4) 244, 235, 226, 217, 208, 199, 190, 181, 172, 163, 154, 145, 136, 127, 118, 109, 100, 91, 82, 73, 64, 55, 46, 37, 28, 19, 10, 1; (Pass 5) 247, 238, 229, 220, 211, 202, 193, 184, 175, 166, 157, 148, 139, 130, 121, 112, 103, 94, 85, 76, 67, 58, 49, 40, 31, 22, 13, 4; (Pass 6) 241, 232, 223, 214, 205, 196, 187, 178, 169, 160, 151, 142, 133, 124, 115, 106, 97, 88, 79, 70, 61, 52, 43, 34, 25, 16, 7; (Pass 7) 245, 236, 227, 218, 209, 200, 191, 182, 173, 164, 155, 146, 137, 128, 119, 110, 101, 92, 83, 74, 65, 56, 47, 38, 29, 20, 11, 2; (Pass 8) 239, 230, 221, 212, 203, 194, 185, 176, 167, 158, 149, 140, 131, 122, 113, 104, 95, 86, 77, 68, 59, 50, 41, 32, 23, 14, 5; and (Pass 9) 242, 233, 224, 215, 206, 197, 188, 179, 170, 161, 152, 143, 134, 125, 116, 107, 98, 89, 80, 71, 62, 53, 44, 35, 26, 17, 8.

The step or process of generating the valve pattern may then continue with selecting the valves that need to irrigate (e.g., with the second phase or step 1830 of method 1800 in FIG. 18). The process may include inspecting or processing the data associated with each valve on the pivot or sprinkler arm in the order determined above in the first phase or step 1820. If the valve is not over an exclusion or no spray zone (as defined by the farmer or irrigator operator), the number of pulses is calculated that is required within the length of hysteresis previously determined (e.g., in the VRI control method 400 at 460) as well as the typical number of "off" cycles there should be between each "on" cycle.

The typical number of "off" cycles is important to ensure an even pattern of pulsing for each valve. For example, in order to achieve three pulses out of nine, it may be preferable to pulse a particular valve "On Off Off On Off Off On Off Off" rather than "On On On Off Off Off Off Off Off." The number of pulses required over the length of hysteresis is equal to: (Percent of Full Depth)*(Percent Velocity)*(Hysteresis Length). Further, the typical number of "off" cycles between each "on" cycle is equal to: (Hysteresis Length)/(Number of Pulses Required). The typical number of "off" cycles is not necessarily a whole number, as it may be, for example, that 4.5 out of 12 cycles is the ideal gap. Because the valve can only either be "on" or "off", the typical number of cycles can be truncated (in the prior example to 4 cycles) when testing for an actual number of cycles. When testing for an average spacing across the entire hysteresis, the actual value (in this example, 4.5 cycles) can be used.

The hysteresis may become invalid when a nozzle moves from one irrigation zone into the next. For example, if moving from a higher to lower application area (again, as may be defined by the farmer or irrigator operator), the hysteresis suggests that the nozzle has significantly over watered. If moving instead from a lower to a higher application area, the hysteresis would suggest that the nozzle had significantly under watered. The effects of this would cause a surging effect on the flow management as valves would suddenly need to be always on or always off for an extended time period. With these issues in mind, the overall functionality of the VRI control method is designed so as to be weighted more to managing flow that to uniformity of depth. In other words, the inventor determined that it is more important to keep flow even than to achieve a perfect distribution of application depth.

Because of these issues associated with moving between variable rate irrigation zones, the hysteresis is seeded with some random data as if it had been in the new irrigation zone forever. In one useful implementation of the VRI control method, the hysteresis is seeded so that averaging flow can begin as soon as the nozzle crosses with the rotating sprinkler arm into a new zone (as indicated by the arm location 166 and the irrigation plan 1670 with its definition of the location of variable application depth zones (and their geographic boundary locations)).

The seeding of hysteresis is typically only done in the control method when changing to an application rate above zero. The control method does not seed when the valve is moving into an exclusion or no spray zone, as these zones prefer to have the valves always "off" In the event that more water flow is present than a rate of zero allows for a valve, the excess water will have to be dispersed onto the exclusion or no spray zones. The previous recent irrigation is taken into account in excess dispersal, and, therefore, maintaining the hysteresis rather than seeding the hysteresis is important for managing application for exclusion or no spray zones. The seeding is partly based on the valve position so that a group of valves changing to the same rate at the same time will not all have an identical seeded hysteresis. The spacing and total number of "on" records in the hysteresis will match the number of pulses required and the typical number of "off" cycles already calculated.

The next step or substep within the valve selection process is to calculate the number of "off" cycles there have been since the valve was last on. The actual "off" cycles is used to compare against the typical number of "off" cycles.

This may involve recording two values against the valve: (1) the valve's variance from the number of pulses required; and (2) a state of "on", "can be on", "preferred off", or "off" The "on" state and the "off" state are for valves that are selected in the first selection phase, and these valves will be set to this state. The "can be on" state and "preferred off" state are indications for the second selection phase to use when choosing valves.

The variance from pulses required is the number of pulses required less the number of "on" cycles in the hysteresis. If the variance is greater than zero, then the valve "can be on" (i.e., the valve can irrigate without overwatering). If the variance is not greater than zero, then the valve is "preferred off" (i.e., valves that if turned on will overwater or the valve is over an exclusion zone). The valves that "can be on" are further tested in the VRI control method based on whether the number of "off" cycles since the valve was last on is greater than the typical number of "off" cycles. In such an event, the control method would "prefer" that the valve be on if there is enough water flowing through the sprinkler arm. If adding this valve would not exceed the total input flow, the valve will be "on" for the next duty cycle. If adding the valve would exceed the total input flow, however, the valve selection process will set the valve as "off" for the next duty cycle.

For nozzles determined to be over an exclusion zone, the variance from pulses required will be a negative number, and, over time, these numbers can become larger negative numbers. In the event that the input water flow exceeded the variable application depth zone's requirements and the control method needs to operate the irrigation system to disperse excess water over exclusion zones, an imbalance in the variance values would make this difficult to do with even distribution. To avoid this issue, for nozzles over an exclusion or no spray zone, the variance from pulses required can be set to the number of "off" cycles in the hysteresis. Further, to ensure that the exclusion zone nozzles are selected as a last resort in the next phase or step 1850 of the control method 1800, the variance is shifted below zero by an order of magnitude that ensures the highest variance value on an exclusion zone valve is lower than the lowest possible value of variance for an irrigating valve. One useful mechanism or technique to provide this result is to subtract two times the maximum hysteresis length from the variance value on all exclusion zone valves.

The method 1800 may then continue with the third phase or step 1850 to select additional valves to be "on" for the valve on/off pattern for the next duty cycle to meet the input flow rate (e.g., when the farmer or irrigator user drew too big of an exclusion zone under the sprinkler arm for the particular input water flow). The third phase or step 1850 is only necessary if the total flow rate of the nozzles on the valves selected in the second phase or step 1830 did not reach the input flow rate (as determined at step 1840 of the control method 1800). If more water has to be expelled in order to make the total output flow meet the input flow, the controller will select further valves to open. Valves having the greatest need for water are chosen first progressing to those valves with the least need. Finally, if necessary, valves with nozzles over exclusion zones will be chosen to be "on." The process continues until the total flow rate of the valves selected meets (or exceeds) the input flow rate.

The first step or substep in this final valve selection phase (step 1850) is to further sort the valve list already sorted in the first phase (step 1820). In the second phase (step 1830), each valve was given a value of variance from the number of pulses required. The list of already sorted valves is sorted in descending order by this variance. In doing so, the valves are grouped by their variance, keeping those valves with the greatest need for water at the beginning of the list. Each valve in the list is considered by the controller in the sorted order, but the list is filtered to only include the valves that in the second phase (step 1830) were determined to have a state of "can be on" or "preferred off." If the valve is not in one of these two states, the controller has already determined that the valve must be "on" or "off."

Each valve is considered as to whether turning this valve on would cause the total flow through the open nozzles of the arm to exceed the input flow. If the valve can be turned on, the flow rate of this valve is added to the total and its state is set to "on" in the valve open/close (or on/off) pattern for the next duty cycle. For valves having a "preferred off" state rather than "on" state, the controller sets them to a state of "overridden on." This does not have a functional difference to irrigation as either setting will allow the flow of water (e.g., the valve will be controlled to be open), but it does allow logging and reporting of occasions when a valve was turned on in excess of irrigation requirements. As a processing optimization, the third phase process (or step 1850) can stop as soon as any valve would have caused the total output flow to exceed the total input flow. Allowing the process to continue will bring the final flow rate as close as possible to the input flow but, at the same time, the longer the third phase continues the more valves are allowed to irrigate that would be better controlled so as to wait for a future duty cycle for a longer term average stable flow rate.

The method 1800 may then continue with the fourth phase (or step 1860) involving updating the hysteresis for each valve. Every valve's hysteresis is updated whether or not it is allowed to irrigate (turned to "on" or opened) in a duty cycle. Both "off" and "on" states are used as part of the selection process and are preferably documented over the operation of the irrigation system. As noted with regard to the modified method 400 and step 460, the example calculations included a limitation to the hysteresis to 32 cycles as a memory optimization. If the hysteresis has reached the maximum length, the oldest item in the hysteresis is dropped. All of the hysteresis values are aged by one cycle. For example, in a 30-second duty cycle system, all events recorded as occurring 60 seconds ago are aged to be now 90 seconds ago. At the now empty (most recent) history point in the hysteresis, the controller records whether the valve was open or closed. The controller continues with performing step 480 in the VRI control method 400 and commands the valves to open or close based on the determinations made in the method 1800 (e.g., based on the valve open/closed pattern for the next duty cycle 1680).

Figure 19A:
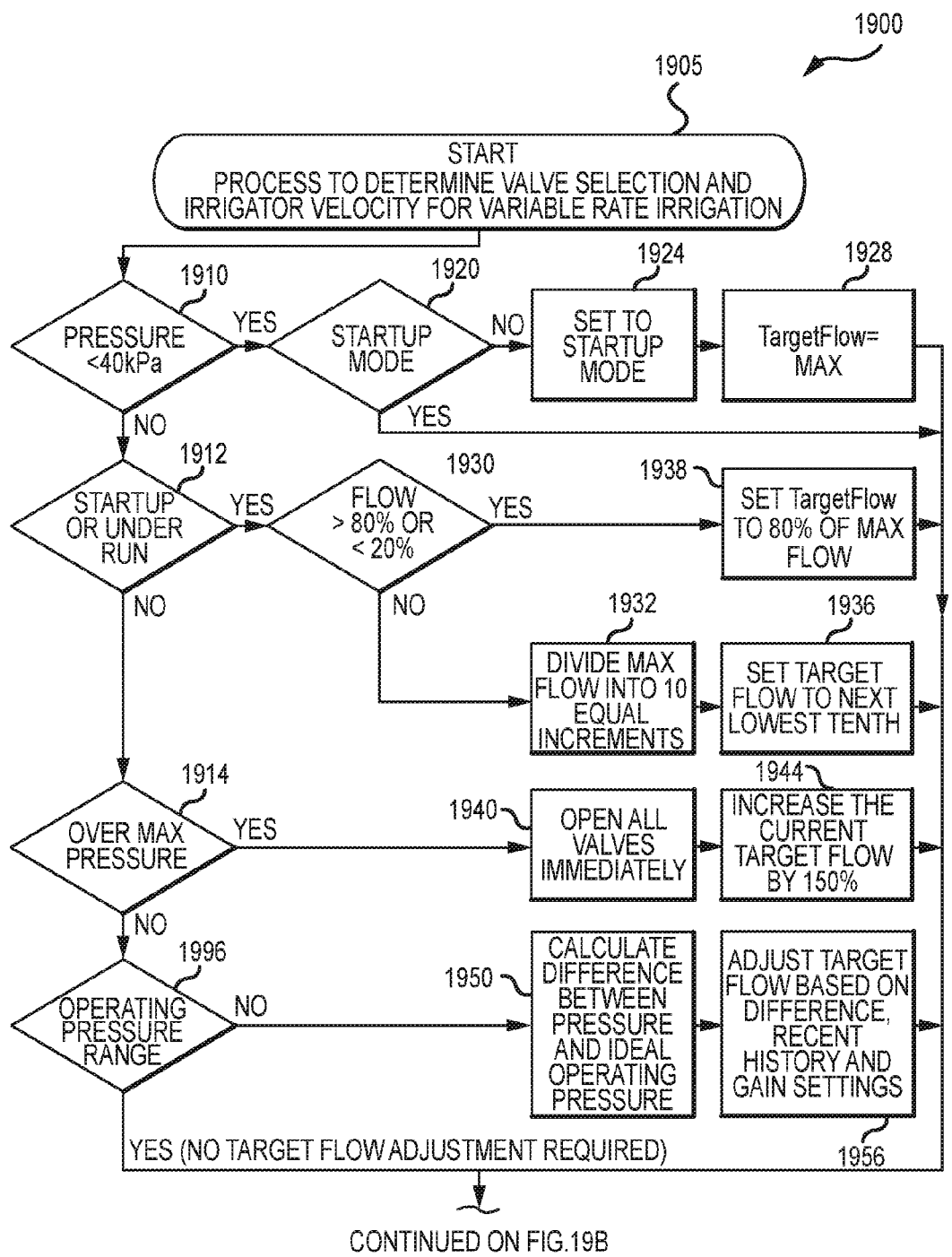
FIG. 19 is a flow diagram of a control method of the present description including detailed process explanation including calibration at start up and showing a valve selection (e.g., step 1990)
Figure 19B:
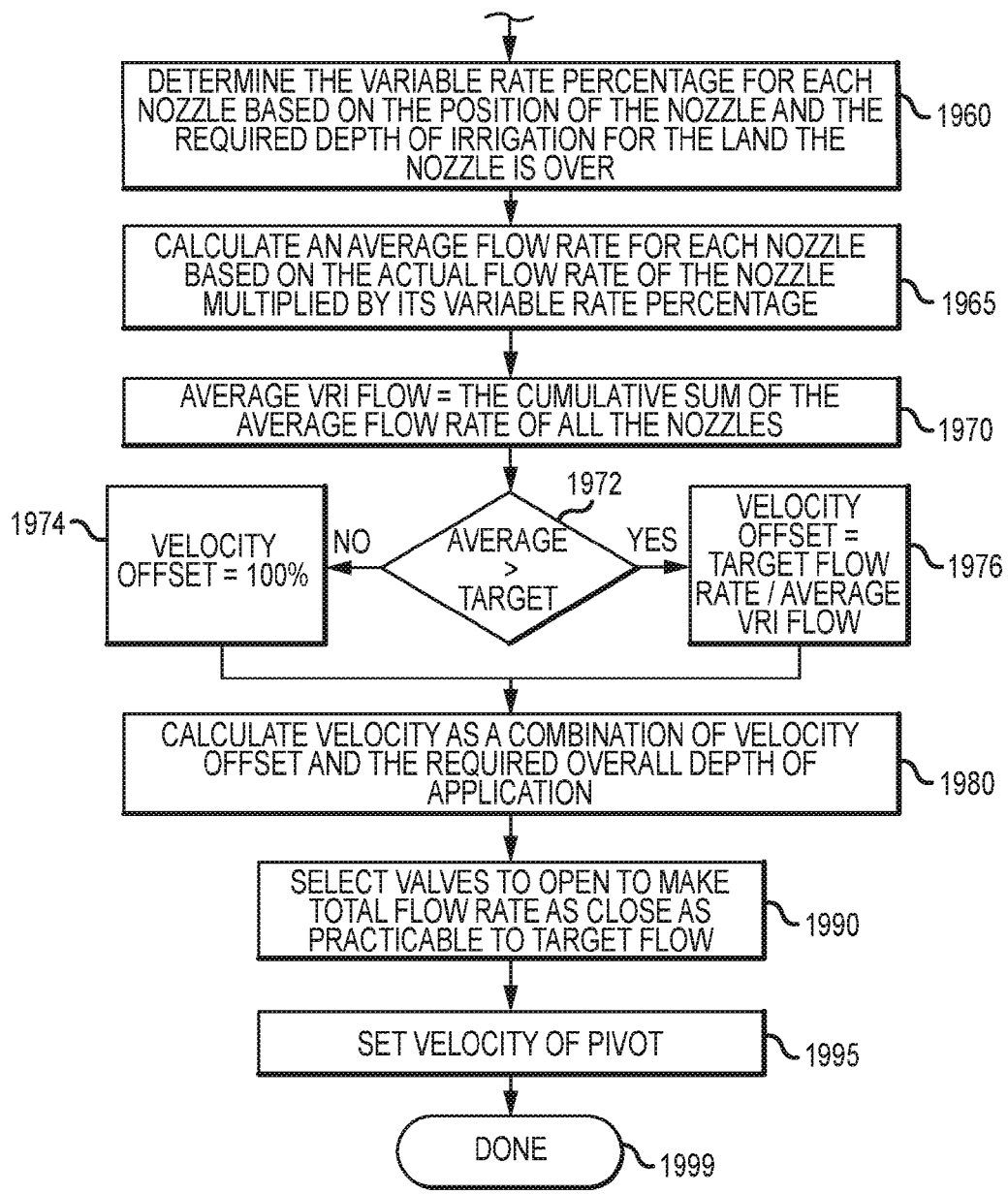
Figure 20A:
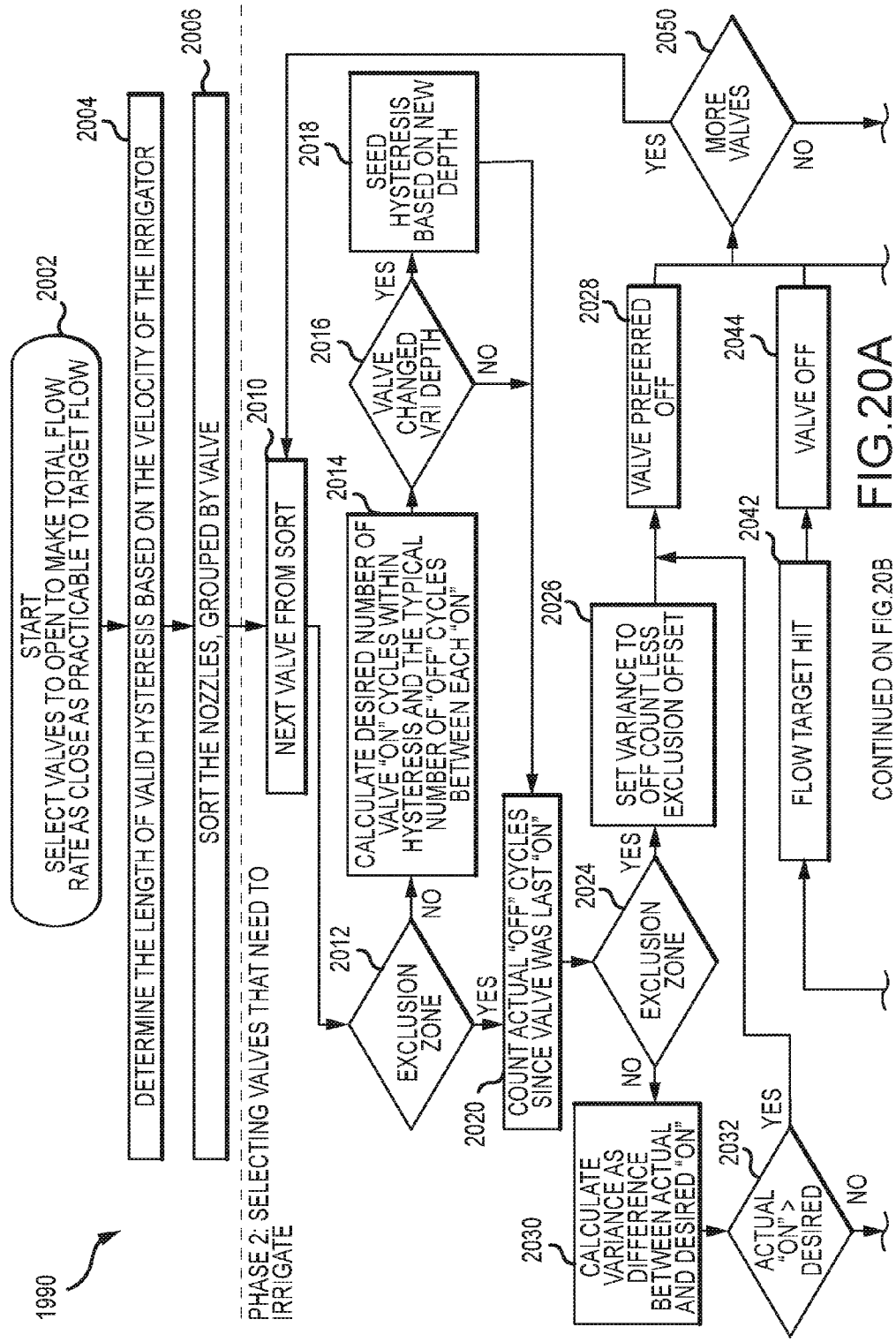
FIG. 20 is a flow diagram showing the processes or functions carried out as part of valve selection for a valve open/close pattern for controlling a sprinkler system in a next duty cycle (e.g., showing phases two, three, and four described with reference to FIG. 18 or a detailed explanation of step 1990 in FIG. 19).

FIG. 19 is a flow diagram of an overall control method 1900 of the present description including detailed process explanation including calibration at start up, and FIG. 20 is a flow diagram showing the processes or functions carried out as part of valve selection 1990 for a valve open/close pattern for controlling a sprinkler system in a next duty cycle (e.g., showing phases two, three, and four described with reference to FIG. 18 (e.g., FIG. 18 is a summary of FIG. 20)). The method 1900 starts at 1905 such as with a variable application depth routine/software module (as shown at 1658) being loaded onto a flow and placement controller of an irrigation station. The startup step 1905 may also include retrieving or generating an irrigation plan (e.g., plan 1670 in memory 160 of the controller 1650) defining exclusion zones as well as variable application depth irrigation zones (or VRI zones) along with the desired depths (e.g., percentages/fractions of 100 percent application in some cases) (as shown at 172 and 1674 in FIG. 16).

The method 1900 may generally begin with calibrating the flowrate at startup of an irrigation system implementing the VRI control method 1900. Calibration includes at step 1910 a determination of whether the measured pressure is greater than some predefined operating pressure such as 40 kPa. If not, the method 1900 continues at 1912 with a determination of whether operations are in startup mode or in under run mode. If not in startup mode, the method 1900 continues at 1914 with a determination of whether the currently measured pressure in the pivot base is over maximum pressure for the irrigation system. If not, the method 1900 continues at 1996 with determination of whether or not the measured pressure is within the predefined operating pressure range for the irrigation system (e.g., its nozzles and valves). If yes at 1996, the method 1900 continues at 1960 but, if not, the method 1900 continues at 1950 with calculating the difference between the measured pressure and the ideal operating pressure and then at 1956 with adjusting target flow based on the difference from step 1950, recent history, and gain settings prior to performing step 1960. If "no" at step 1914, the method 1900 continues at 1940 with the controller opening all the valves and then at 1944 with increasing the current target flow by a preset increase amount (e.g., by 50 percent to set the target flow to 150 percent or the like) prior to continuing with step 1960.

If at step 1910 the pressure is determined to be less than the predefined operating pressure (or 40 kPa in this example), the method 1900 continues at 1920 with checking to see if the irrigation system is operating in startup mode. If not, the method 1900 continues at 1924 with initiating or setting operations to startup mode, and then at 1928 setting the target flow to a predefined maximum value for the irrigation system (or its valves and nozzles). The method 1900 then proceeds to step 1960 (also if at 1920 the system is already set to startup mode, the method 1900 jumps to step 1960).

When at step 1912, the controller determines that the pressure is greater than 40 kPa and the system is in startup mode or the current pressure is below running pressure, the method 1900 continues at 1930 with determining whether the input flow is outside a predefined/predetermined flow range (such as 20 to 80 percent of a predefined maximum or 100 percent flow rate). For example, the "Under Run" in FIG. 19 may mean the current pressure is below the running pressure. Then, at step 1912, if the system is in startup mode or the current pressure is below the running pressure, the control method uses the tenths process to try and rapidly get to the correct operating pressure. If the input flow is measured to be outside this range (e.g., greater than 80 percent or less than 20 percent), the method 1900 continues at 1938 with setting the target flow to 80 percent of the maximum flow. If within the range at 1930, the method 1900 continues at 1932 with dividing the maximum flow into a number (e.g., 10) of equal increments and then at 1936 setting the target flow to a next lowest increment (next tenth). After steps 1936 and 1938, the method 1900 continues at step 1960.

At 1960, the method 1900 continues (after calibrating the flowrate) with determining the current variable rate percentage for each nozzle in the pivot or along the sprinkler arm. This is determined based on the current position of the nozzle (e.g., where is the sprinkler arm in the field and what is the location of the nozzle on the arm) relative to the field/land being irrigated. This nozzle location is then used to look up in the irrigation plan stored in memory for the field the irrigation zone (or exclusion zone) under the nozzle and the assigned application depth for that zone (e.g., zero or no spray for an exclusion zone and a user-defined but variable rate for other irrigation zones). Then, at 1965, the method 1900 continues with calculating an average flow rate for each nozzle based on the actual flow rate of the nozzle multiplied by its variable rate percentage.

At step 1970, the controller sets the average VRI flow to be equal to the cumulative sum of the average flow rate of all the nozzles in the sprinkler arm or pivot. Then, at 1972, the controller determines whether this average flow rate is greater than the target flow. If not, the method 1900 continues at 1974 with setting the velocity offset to 100 percent. If greater than the target flow, the controller at 1976 acts to set the velocity offset to be equal to the target flow rate divided by the average VRI flow. In these steps, it should be understood that the "velocity offset" is the velocity percentage of the pivot at the pivot's minimum application depth.

At 1980, the method 1900 continues with calculating velocity for the pivot or sprinkler arm. For example, the controller may combine the velocity offset and the required overall depth of application. Then, at step 1990, the method 1900 continues with selecting the valves to include as open or "on" in the next duty cycle (e.g., in the valve open/close pattern) to make the total flow rate as close as practicable to the target flow set during calibration, and this pattern is used to generate control signals to the solenoid valves to open (or remain closed) as appropriate. Then, at 1995, the controller sets controls the drive motors to set the velocity of the pivot using the velocity calculated in step 1980. The control method 1900 would then typically repeat beginning at step 1910 or may end at 1999.

FIG. 20 illustrates the valve selection process of (or subroutine) step 1990 in more detail with it starting or being called by the main routine of the controller at 2002. At 2004, the subroutine 1990 involves determining the length of a valid hysteresis based on the velocity of the pivot irrigator. Then, the nozzles are sorted (with grouping by valve) (e.g., see discussion of the first phase and step 1820 in FIG. 18).

The second phase of the VRI control method then begins as shown at 2010 of subroutine 1990 with choosing a next valve from the sort (e.g., the largest numbered valve or outer most valve in the sort). At 2012, the controller determines whether or not the valve is presently located over an exclusion zone (as defined by a farmer/user in an irrigation plan). If not, the subroutine 1990 continues at 2014 with calculating the desired number of valve "on" cycles within the hysteresis and determining the typical number of "off" cycles between each "on" state. Then, at 2016, the subroutine 1990 continues with determining whether or not the valve has changed from the last duty cycle into a new VRI depth (e.g., moved from one irrigation zone to another or into or out of an exclusion zone). If not, the subroutine 1990 continues at 2020. If yes at 2016, the controller acts at 2018 to seed the hysteresis for this valve based on the new depth.

At 2020, the subroutine 1990 involves counting actual "off" cycles since this valve was last "on." At 2024, the controller determines whether or not the valve is presently located over an exclusion or no spray zone. If "yes" at 2024, the subroutine 1990 continues at 2026 with setting the variance to the off count less the exclusion offset prior to continuing 2028 with setting the valve state to "valve preferred off" (e.g., the control method is designed to leave valves over exclusion zones closed or off if possible based on flow rates).

If "no" at 2024, the subroutine 1990 continues at 2030 with calculating the variance as the difference between actual and desired "on" cycles for the valve. Then at 2032, the controller determines whether or not the actual "on" cycles for the valve are more than the desired amount or frequency. If "yes" at 2032, the valve is set to "valve preferred off" at 2028. If "no" at 2032, the method 1990 continues at 2034 with determining whether the actual "off" pulsing frequency is greater than the typical number of "off" cycles between each "on" calculated at step 2014. If "no" at 2034, the controller sets the valve state to "valve can be on" at 2038.

If "yes" at 2034, the method or subroutine 1990 continues at 2040 with determining whether the total flow plus the valve's flow would be less than the target flow. If not, the controller at 2042 sets a flow target monitor value to indicate the flow target has been hit, and, with this change in mind, the controller at 2044 sets the valve's state to "valve off." If "yes" at step 2040, the subroutine 1990 continues at 2046 with the controller adding the valve's flow to the total flow, and the controller at 2048 then sets the valve's state to "valve on" (e.g., so it will be controlled to open in the next duty cycle). The subroutine 1990 then continues (after steps 2028, 2038, 2044, and 2048) with step 2050 in which the controller determines whether or not there are more valves to process in the sort results from step 2006. If yes, the method 1990 continues at step 2010, and if not, the method continues at 2060 or the initiation of the third phase (or steps 1840 and 1850 of method 1800 in FIG. 18).

The third phase (selecting additional valves to meet input flow rate) begins at 2060 with the controller determining whether or not the flow target has yet been met or exceeded by the valves selected in the second phase (steps 2010 through 2050). If yes, phase three is skipped and the subroutine continues at 2080 with the fourth phase with updating the hysteresis for each valve on the pivot or sprinkler arm. If the flow target has not yet been met as verified at 2060, the method 1990 continues at 2062 with the controller further sorting the valves by descending variance, and, at 2064, with identification of the next valve in the sort from 2062.

Then, at 2068, the controller determines whether the valve has a state or setting of "can be on" (from step 2038) or "preferred off" (from step 2028). If not, the method 1990 continues at 2070 with the controller determining whether there are more valves left in the sort. If not, the method 1990 continues with step 2080. If more valves remain in the sort, the method 1990 continues at 2064. If "yes" at step 2068, the subroutine 1990 continues at 2074 with the controller determining whether the total flow plus this valve's flow is less than the target flow. If not, the flow target monitoring value is updated to indicate it has been met or exceeded, and the subroutine 1990 continues at 2080. If the target flow has not yet been exceeded, the subroutine 1990 continues at 2073 with the controller adding the valve's flow to the total flow, and then at 2079 with setting this valve to "on" (e.g., selecting this valve for the valve open/close pattern for the next duty cycle). Then, the method 1990 continues at 2070.

After step 2060, 2070, or 2076, the subroutine 1990 continues at 2080 with the controller choosing a next valve for hysteresis updating. Then at 2082, the controller acts to age the valve's hysteresis by one cycle (with 32 cycles being retained in some cases). Then, at 2084, the controller acts to determine whether this particular valve is "on." If "yes," then at 2086, the controller marks the current hysteresis point as "on," or if "no," then at 2088, the controller marks the current hysteresis point as "off." The method 1990 continues at 2090 with determining whether or not more valves need to have their hysteresis updated. If "yes," the method 1990 continues at 2080. If no more valves at 290, the method 1990 ends at 2098, and control may be returned to the calling method/routine 1900 to continue with step 1995.

While this disclosure contains many specifics, these should not be construed as limitations on the scope of the disclosure or of what may be claimed, but rather as descriptions of features specific to particular embodiments of the disclosure. Furthermore, certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments, and it should be understood that the described program components and systems can generally be integrated together in a single software and/or hardware product or packaged into multiple software and/or hardware products.

The above described embodiments including the preferred embodiment and the best mode of the invention known to the inventor at the time of filing are given by illustrative examples only.

I claim:

1. A center pivot irrigation system, comprising:
    a sprinkler arm comprising one or more pipe segments each including a plurality of spaced apart nozzles;
    a plurality of towers supporting the sprinkler arm, wherein a drive motor is provided on each of the towers to drive wheels on the tower to rotate the sprinkler arm about a center pivot axis at a rotation speed;
    a water supply providing input water to the sprinkler arm;
    a plurality of control valves each provided on the sprinkler arm upstream of a subset of the plurality of spaced apart nozzles;
    a controller comprising memory and a processor running software code or programs stored in the memory to provide a valve operation that, for each of a plurality of sequential valve duty cycles, includes generating a valve pattern defining a group of the plurality of spaced apart nozzles to discharge the input water from the sprinkler arm, wherein the controller is communicatively linked to the control valves and transmits control signals to the control valves causing the control valves associated with the group of the plurality of spaced apart nozzles to open; and
    a location monitor on the sprinkler arm determining a current geographic location of the sprinkler arm,
    wherein the controller generates the valve pattern based on both the current geographic location and an irrigation plan defining a first irrigation zone and a second irrigation zone, the first irrigation zone being assigned a first application depth and the second irrigation zone being assigned a second application depth differing from the first application depth,
    wherein the sprinkler arm is positioned by rotation about the center pivot axis to concurrently extend over the first and second irrigation zones for a plurality of the valve duty cycles, and
    wherein the group of nozzles defined by the valve pattern differs for each sequential pair of the valve duty cycles.

2. The system of claim 1, wherein the controller generates the valve pattern for each of the valve duty cycles to output the input water at a flow rate within a predefined range of flow rates including a rate measured for the input water to the sprinkler arm.

3. The system of claim 2, further comprising at least one of a flow meter and a pressure gauge measuring flow rate of the input water and pressure of the input water, wherein the valve pattern is generated for each of the valve duty cycles to provide the output of the input water at the flow rate based on at least one of the measured flow rate and the measured pressure of the input water.

4. The system of claim 1, wherein the irrigation plan further includes an exclusion zone and wherein any of the nozzles determined to be located above the exclusion zone are preferentially excluded from the group of nozzles used to discharge the input water from the sprinkler arm by the controller.

5. The system of claim 1, wherein the controller generates and transmits a speed control signal to one or more of the drive motors to adjust the rotation speed of the sprinkler arm based on a density of open valves in the valve pattern to maintain the first or second application depth.

6. The system of claim 1, wherein the controller retrieves hysteresis for each of the valves and generates the valve pattern based on the hysteresis.

7. The system of claim 6, wherein the hysteresis provides an on and off history of each of the valves for a predefined number of the valve duty cycles.

8. The system of claim 7, wherein the predefined number is in the range of 20 to 40.

9. The system of claim 7, wherein the valve pattern is generated to include valves that need to irrigate based on the on and off history and the first or second application depth.

10. A center pivot irrigation system, comprising:
    a sprinkler arm comprising one or more pipe segments each including a plurality of spaced apart nozzles;
    a plurality of towers supporting the sprinkler arm, wherein a drive motor is provided on each of the towers to drive wheels on the tower to rotate the sprinkler arm about a center pivot axis at a rotation speed;
    a water supply providing input water to the sprinkler arm;
    a plurality of control valves each provided on the sprinkler arm upstream of a subset of the plurality of spaced apart nozzles;
    a controller comprising memory and a processor running software code or programs stored in the memory to provide a valve operation that, for each of a plurality of sequential valve duty cycles, includes generating a valve pattern defining a group of the plurality of spaced apart nozzles to discharge the input water from the sprinkler arm, wherein the controller is communicatively linked to the control valves and transmits control signals to the control valves causing the control valves associated with the group of the plurality of spaced apart nozzles to open; and
    a location monitor on the sprinkler arm determining a current geographic location of the sprinkler arm,
    wherein the controller generates the valve pattern based on both the current geographic location and an irrigation plan defining a first irrigation zone and a second irrigation zone, the first irrigation zone being assigned a first application depth and the second irrigation zone being assigned a second application depth differing from the first application depth, wherein the controller retrieves hysteresis for each of the valves and generates the valve pattern based on the hysteresis, and wherein the hysteresis provides an on and off history of each of the valves for a predefined number of the valve duty cycles.

11. The system of claim 10, wherein the valve pattern is generated to include valves that need to irrigate based on the on and off history and the first or second application depth.

12. The system of claim 10, wherein the group of nozzles defined by the valve pattern differs for each of the valve duty cycles and wherein a differing set of the valves is closed during each of the valve duty cycles.

13. The system of claim 10, wherein the sprinkler arm is positioned by rotation about the center pivot axis to concurrently extend over the first and second irrigation zones and wherein the controller generates the valve pattern for each of the valve duty cycles to output the input water at a flow rate within a predefined range of flow rates including a rate measured for the input water to the sprinkler arm.

* * * * *